(12) United States Patent
Czajka et al.

(10) Patent No.: US 9,037,645 B2
(45) Date of Patent: May 19, 2015

(54) CONTACT BUILDER

(71) Applicant: Xchangewithme LLC, Brighton, MI (US)

(72) Inventors: Ronald J. Czajka, Brighton, MI (US); Sam B. Attisha, West Bloomfield, MI (US)

(73) Assignee: XCHANGEWITHME, LLC, Brighton, MI (US)

( * ) Notice: Subject to any disclaimer, the term of this patent is extended or adjusted under 35 U.S.C. 154(b) by 0 days.

(21) Appl. No.: 14/032,664

(22) Filed: Sep. 20, 2013

(65) Prior Publication Data

US 2014/0019531 A1    Jan. 16, 2014

Related U.S. Application Data

(63) Continuation of application No. 13/021,504, filed on Feb. 4, 2011, now abandoned.

(51) Int. Cl.
*H04L 29/06* (2006.01)
*G06Q 10/10* (2012.01)

(52) U.S. Cl.
CPC .............. *H04L 67/42* (2013.01); *G06Q 10/107* (2013.01)

(58) Field of Classification Search
CPC .................................. H04L 67/42; H04M 1/56
USPC ......................................... 703/203, 204, 205
See application file for complete search history.

(56) References Cited

U.S. PATENT DOCUMENTS

| 8,588,386 B2 * | 11/2013 | Isaacson et al. ......... 379/142.06 |
| 2005/0091316 A1 * | 4/2005 | Ponce et al. ................... 709/205 |
| 2007/0061567 A1 * | 3/2007 | Day et al. ....................... 713/159 |
| 2010/0088246 A1 * | 4/2010 | Lim ............................... 705/319 |

OTHER PUBLICATIONS

"SQL Profiles: Technical Overview"—Oracle, May 2010.*

* cited by examiner

*Primary Examiner* — Randy Scott
(74) *Attorney, Agent, or Firm* — Young Basile

(57) ABSTRACT

A web-based contact builder, management system and a computer-implemented method to assist a user in efficiently managing and communicating with their designated contacts. The system enables a user to manage existing contacts; to identify via automated means new contacts and determine if they are registered users, or to invite them to join the system; to invite and respond to requests from new contacts in an efficient "one step" method; and to set the level of access that each contact will have to the user's personal identifying information.

11 Claims, 24 Drawing Sheets

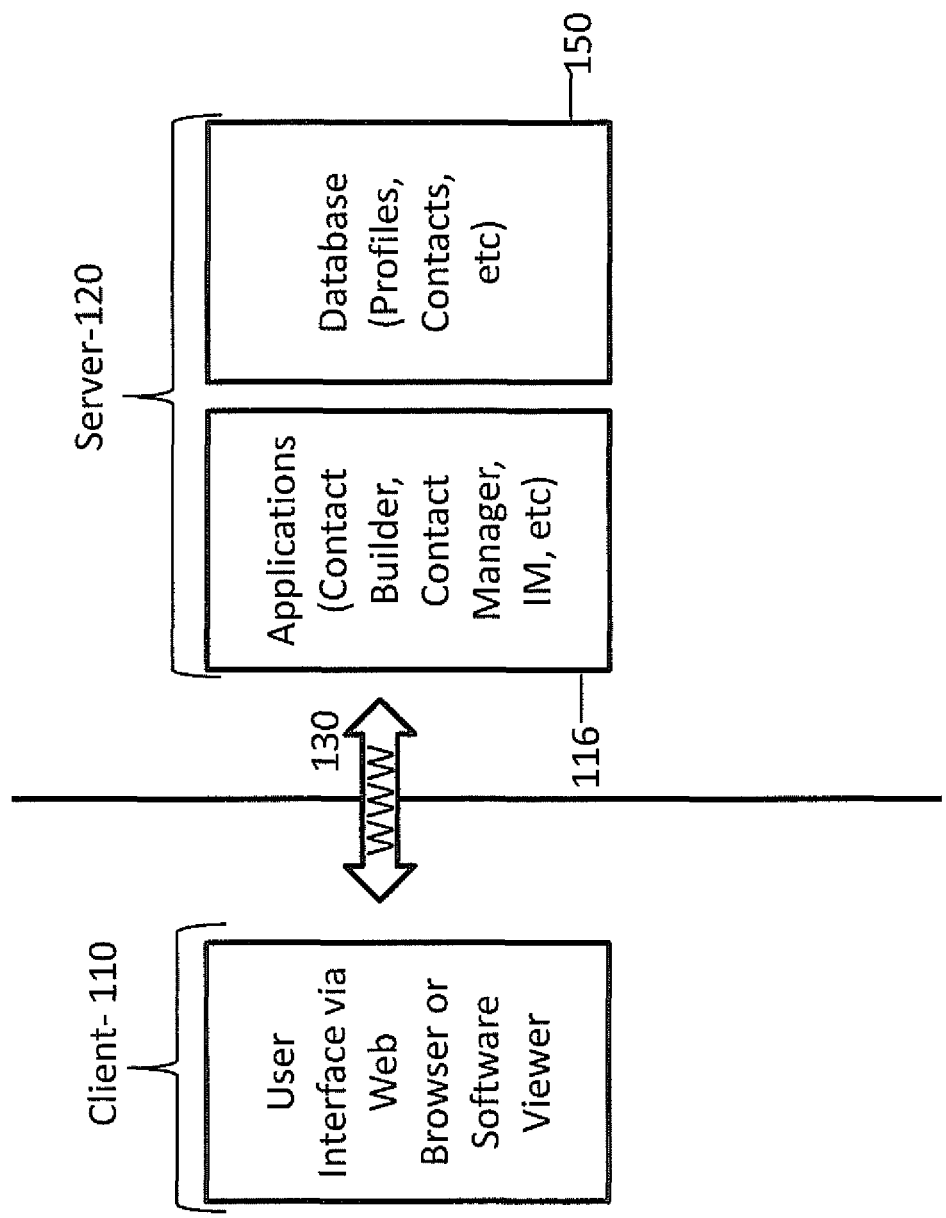

CONTACT BUILDER

CROSS REFERENCE TO RELATED APPLICATION

This application is a continuation of U.S. patent application Ser. No. 13/021,504, filed Feb. 4, 2011, which is incorporated herein by reference in its entirety.

BACKGROUND OF THE INVENTION

1. Field of the Invention

The present invention relates generally to multi-user web-hosted data management computer systems and services for users to locate and exchange personal contact information.

2. Description of the Related Art

The prior art discloses various methods and systems to assist individuals in maintaining and updating a list of communication contact information for their personal and professional affiliations, otherwise known as "contacts". This information primarily consists of the identity of individuals and organizations with whom an individual interacts for either social or business reasons, or both. Information may include name, geographic location, job title and organization, as well as a method of communicating with them: email addresses, telephone numbers, postal mail addresses, and etc. . . . "Contact managers" are commercial software packages and services that store this information for each of its users, thus allowing them to manage contacts and to locate other users within the service to connect with. For example, there are several web based contact managers available today such as Google, Yahoo! and Hotmail. None offer the advanced features claimed in the present invention for efficiently controlling the type of information disclosed and for an automated method of identifying potential new contacts, otherwise known herein as the "contact builder".

For example, U.S. Pat. No. 7,194,419, entitled "Network-based personal contact manager and associated methods", discloses methods of permitting a user of a contact management system to authorize viewing of personal information on a user-by-user basis, versus via a class of user. It also has the user being notified when a contact's personal information has changed. It does not offer, though, the ability of accessing a user's email account(s) to locate and extract or receive a carbon copy of incoming and/or outgoing email addresses then cross reference a central contact database and determine if a contact exists in the system's and/or user's contact list and inviting them to register with the central contact database if the contact does not exist or granting access to their personal or professional information if the contact exists. Nor does it provide a "one click" information sharing feature for granting contacts permission to access a user's designated information. Instead, the user must follow, at a minimum, a two-step process by selecting the type of information and then submitting it. For example, a user must specifically select whether to disclose each of the following: travel plans, personal information, work information, birthday notification, and friend of friend information, and then they must hit the "submit" button (FIG. 1).

What the prior art lacks is an efficient one-step method for a user of a contact management system to designate what types and amount of their personal information to make available to other registered system users. Additionally, there is a need within the contact management services industry for an efficient method of accessing a user's email account(s) to locate and extract or receive a carbon copy of incoming and/or outgoing email addresses. These email addresses may then be compared or "cross referenced" with those in a central contact database to determine if a contact already exists in the system's and/or user's contact list; and if not, then to invite them to register with the central contact database or provide others access to their personal or professional information.

SUMMARY OF THE INVENTION

The present invention provides an automated system and a computer-implemented method for a user of the contact management service to build and maintain a file of their personal and professional associations that is stored in computer memory on their mobile communications device, personal computer and/or on a remote server through the system's "contact builder." By means of the contact builder system of the present invention, the user of the service is not required to expend time or effort in confirming if an incoming and/or outgoing email is from a contact of the user's on the service, nor in inviting a new email addressee to join their contact list. The system can be configured by the user to access the user's email account(s), on an ongoing or temporary basis, that are hosted by an email service, server or client computer, and to locate and extract or receive a carbon copy of the user's incoming and/or outgoing email addresses and then compare, or "cross reference" the user's incoming and/or outgoing email addresses with the central contact database hosted on the server to initiate an invite to exchange contact information process (if the contact is a user of the system).

In another aspect of the present invention, a system and a method permits and directs the user of the contact builder system the ability to designate in one step (i.e., "one click") the type of their personal information (if any) they wish to exchange with each new contact that they have invited to join their contact list, or whom they have received a request from. The user merely selects the appropriate labeled key, such as: "delete", "home", "work", or "both", and the choice is instantly submitted to the system. The user is thus not required to also select a "submit" key. What is normally, at a minimum, a two-step process of a user granting permission to exchange contact information, is now a one-step process.

The present invention also provides a system and a computer-implemented method that permits and directs a user to set a level of privilege for disclosing any information, i.e., "public" or "private"; as well as a wide variety of personal information that the user may choose to exchange with their contacts on a case-by-case basis. The user may also change their privilege levels at any time. Types of information that the system may store on the server database and show on a case-by-case basis include, but are not limited to: user's name, title, company, availability status, photo, phone numbers, email addresses, fax number, websites, birthdates, anniversaries or other special dates, and preferred modes of communication. The user may also designate their privilege level as "public", which will automatically make available their selected contact information to others upon invite; or they may designate "private", which will require another user to request access to their contact information.

And in accordance with yet another aspect of the present invention, a system and a computer-implemented method directs and provides the user flexibility in the manner they invite new contacts to exchange information. They may set their system to automatically send an invite notification to a contact(s) known as a request if the contact is determined by the system not to be a contact of the user. Or, they may set their system to manually issue invite notifications to a contact(s). The manual invite process provides the user the ability to selectively send invites from a populated list that consist of incoming and/or outgoing emails addresses that are not current contacts of a user and via the one click permission feature to initiate the invite/request process. Also, the user may manually add new contacts email addresses to the invite list and then start the invite/request process via the one click permissions feature. The user can manually add new contacts to the invite list even when the user does not have established communications with the service, for example at a location where their personal communications device and connection to the service is in standby mode. Upon restoring communications or access, the user will be able to initiate the invite process via the one click permission feature.

In an alternative system configuration, the exchange of contact information can be executed peer to peer (p2p). In a peer-to-peer exchange, the contact builder and contact manager software described herein is stored on the client's computing device and contact information is managed and shared among computing devices without a server configuration.

BRIEF DESCRIPTION OF THE DRAWINGS

FIG. 2A is a diagram of the present inventions web-based client computer and system server with database and software components.

FIG. 6A is an illustration of the user's master profile.

FIG. 7A is an illustration of a user's list of contacts.

DETAILED DISCLOSURE

Figure 1:
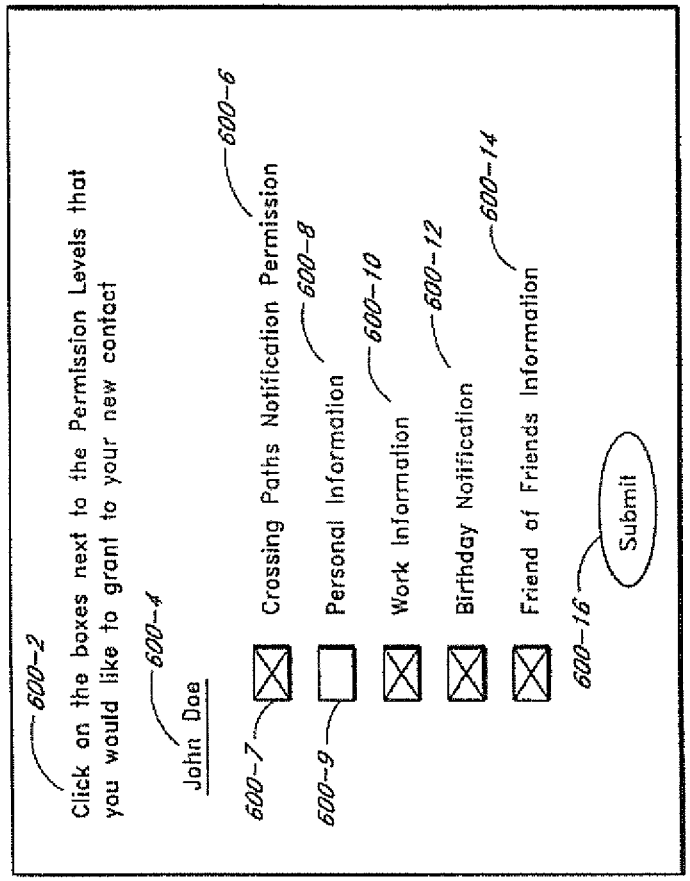
FIG. 1 is a diagram showing the prior art system of "two step" method for submitting contact information.

The present invention comprises a "contact builder system" in conjunction with a "contact manager system" with a web based or a client software application for a user to access with a computer system, such as a personal computer or a personal communications device, for use with a network-based service. The web based, or the peer-to-peer, software applications provide an efficient and reliable means for a user to build and maintain contact information for their personal and professional affiliations. In a preferred embodiment of the present invention the system and service provide both contact builder and manager functionality. The "contact manager" is an application for displaying, managing, and updating a user's personal or professional contact information (name, email, phone, address, photo, etc) that can be exchanged between registered users via the contact builder process; the contact builder and contact manager applications work in conjunction with each other. While there are several examples of web based contact managers, Google, Yahoo, Hotmail, etc. . . . the present invention is different in that it offers users the ability to exchange contact information with each other via the contact builder application and the 'one click' exchange method. The "contact builder" is an application that after a user provides their email settings, user name and password, it accesses the user's email account(s), on an ongoing or temporary basis, locates and extracts or receives a carbon copy of the incoming/outgoing email addresses. It then "cross references" them with the system's contact list and/or a user's contact list, and subsequently initiates an invitation to new contacts. The invitation process comprises requesting a new contact to register and become a user of the system. Then, or if they are already a registered user, the user may transmit an invitation to the new contact either manually or having the system automatically generate one, whereby they request to exchange contact information with the other user, and they select with one electronic input the type of information to share (i.e., home, work, or both home and work contact information). The new contact may respond with one electronic input to ignore the invitation or to accept it by selecting the type of their information to share.

In addition to emails, the contact builder may be configured to access a user's other electronic communications accounts that contain unique identifiers such as mobile call logs or Twitter accounts. The contact builder accesses the user's other electronic communication accounts after the user provides settings, user name and/or password, and locates and extracts or carbon copies of contact's incoming and/or outgoing numbers or screen names on an ongoing or temporary basis. It then "cross references" them with the system's contact list and/or a user's contact list, and subsequently initiates an invitation to new contacts. The invitation process comprises requesting a new contact to register and become a user of the system. Then, or if they are already a registered user, the user may transmit an invitation to the new contact either manually or having the system automatically generate one, whereby they request to exchange contact information with the other user, and they select with one electronic input (i.e., a single action) the type of information to share (i.e., home, work, or both home and work contact information). The new contact may respond with one electronic input to ignore the invitation or to accept it by selecting the type of their information to share.

The present invention provides enhanced features, such as the ability: 1) to identify potential new contacts for the user that the system has cross referenced and determined is a registered user of the service; 2) to issue automatic system generated invites to new contacts that the system has identified but who are cross referenced as not being service members; 3) to invite or receive requests from new "contacts" to join their network of contacts in an efficient one-step method; and 4) to set, and subsequently change, the level of access, otherwise known as the "permission level", that each contact will have to the user's personal identifying information.

System Architecture: FIG. 2A is a diagram of a user accessing the system software through the world wide web and modems or other communications channels on their mobile communications or computing device; and the manner in which the software application can access and reference a user's contacts on both the client and server side. As shown in FIG. 2A, the present invention comprises a user's mobile communications device or computer 110, both of which operate a web browser or a software viewer application, and are linked to and in communication with a secured server computer system 120 via the Internet 130 and/or methods well known in the art. Server 120 houses and operates server software 116, such as the present invention's-contact builder and personal contact manager and instant messenger system. The server 120 also houses the system's database 150 which stores in memory contact information, such as users' profiles and contacts, list of registered users, sent invites, etc. . . . The other components and architecture of the system are well known in the art, and include both server side and client side storage devices, such as hard disks under the control of operating systems executed in RAM and CPUs. The server storage device stores program files and the operating system. Similarly, the client storage devices store the web browser software and the operating systems. The user information is stored on the server and all user access to the user information is mediated by a client web browser or viewer, the web server software and the server personal contact manager software and contact builder. In an alternative embodiment, the user information can be stored concurrently on the server 120 and on the 110 computing device.

The user accesses the information stored in the database 150 by operating their client computing and web interface device 110 with a software application residing in memory on device 110. In a preferred embodiment of the present invention, the server database comprises a list of registered users of the contact manager service. By way of exemplification, types of information that may be stored for each registered user include: user's name, title, company, availability status, photo, phone numbers, email addresses, fax number, websites, birthdates, anniversaries or other special dates, and preferred modes of communication. The software application, which is accessible via a web browser or can be downloadable and installable, allows the user to log into and display information downloaded from server 120. In a preferred commercial embodiment of the present invention, the contact management system, service, and software, enables the client computer 110, via a web browser or its downloaded software application, to communicate with the server 120, which houses the server software applications 140 and a user accessible database 150 of registered users' profiles and contact information. The database 150 contains contact information entered by registered users. The database will also contain a contact table that relates users to each other. Each record in the table represents a relationship between one user and another with certain permission levels set by each user to establish types of their personal information available to each other. The contact builder software application will access the user's email account(s), on an ongoing or temporary basis that are hosted by an email service, server or client computer, and locate and extract or receive a carbon copy of the user's incoming and/or outgoing email addresses and then compare, or "cross reference" the user's incoming and/or outgoing email addresses with the central contact database hosted on the server to initiate an invite to exchange contact information process (if the contact is a user of the system). The server software application 116 of the preferred embodiment also comprises a multitude of other features, such as notifying a set of users of updates made to the database 150 by another user who is on their list of contacts, as well as invites users sent and requests users have received to join other users' contact lists. Each record is date and time stamped or other methods known in the trade.

Figure 2B:
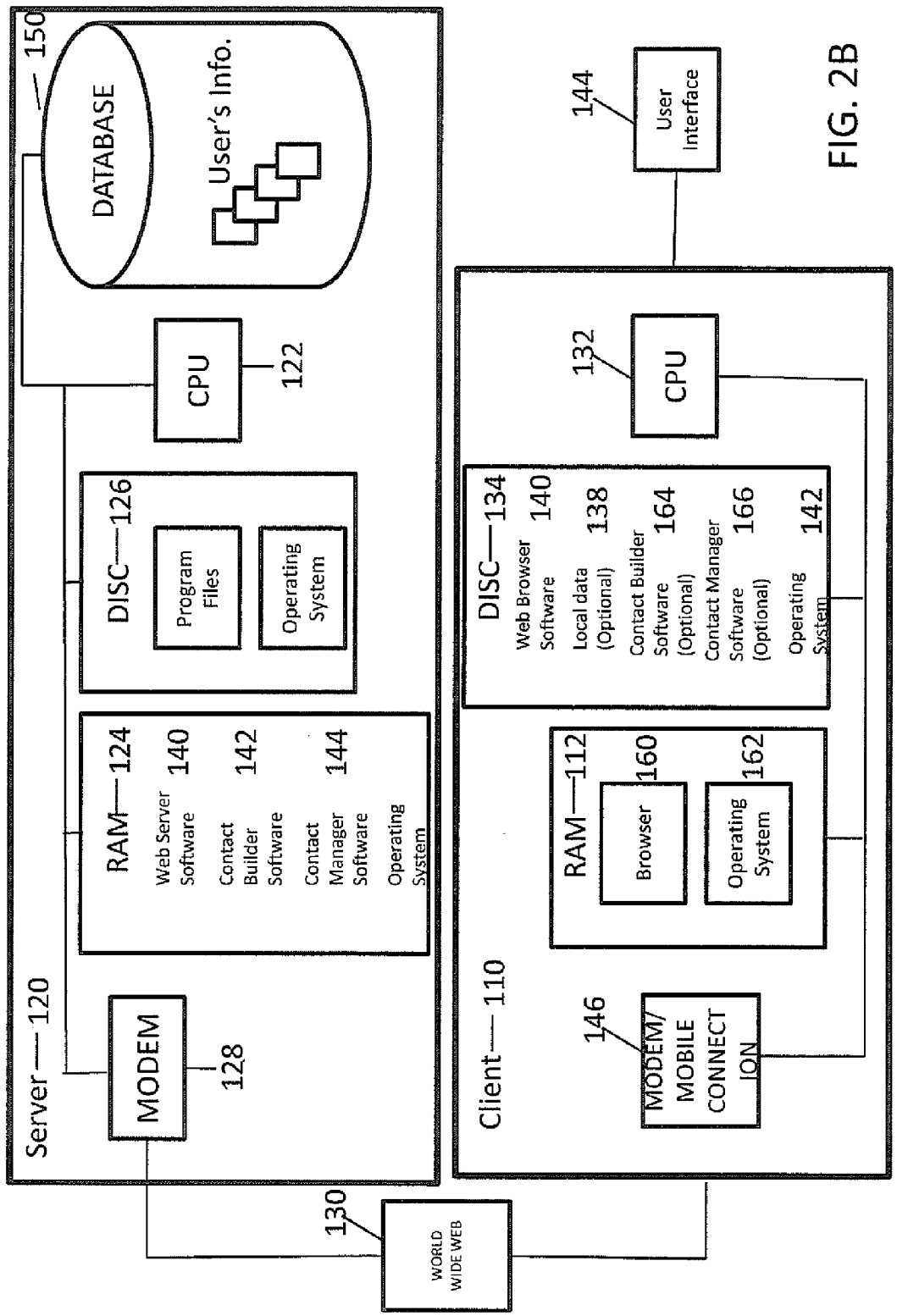
FIG. 2B is a detailed block diagram showing a configuration of the client computer and system server components of a preferred embodiment of the present invention.

FIG. 2B is a more detailed description of a preferred embodiment of the present invention, but other system architectures would readily be apparent to an artisan such that it would provide the same functionality to the user(s). As shown in FIG. 2B, the present invention comprises a primary architecture well known in the art, wherein a user's mobile communications device or computer 110, both of which operate a web browser or software viewer, and are linked to and in communication with a secured server computer system 120 via the World Wide Web (WWW) 130, and modems or other communication channels and/or methods well known in the art (i.e., software applications residing in the client computer memory 112 that allows it to display information downloaded from the system server computer 120). The system server comprises a central processing unit 122, a primary- or random access-memory 124 for program execution, a second storage device 126 (hard disc) for program storage, and a modem 128 or other device for connecting to the computer network. Server 120 also houses and operates web server software 140; separate contact builder 142 and personal contact manager software 144 or modules combined within the same contact management software; databases of user information 150; and (optionally) modules supporting an instant messenger service between system users.

Likewise, the client system 110 comprises a central processing unit 132; a primary-random access memory 112 for program execution of web browser 160 and the client operating system 162; a second storage device 134 (hard disc) for program storage of local data (optional) 138, web browser software 140, contact builder software (optional) 164 and contact management software (optional) 166, and disc operating system 142; a user interface 144; and a modem or other device for connecting to the computer network 146.

The contact builder software (142) housed on the system server, and the contact builder software (164) housed optionally on the client computer provide functionality for the system server to conduct the "cross referencing" feature of the present invention. The "cross reference" feature of the present invention may comprise a reference point taken from one source, such as the user's incoming and/or outgoing email addresses, as compared to another source, such as a storage database of email addresses, so as to determine if it contains related information by means of a software application. Furthermore, the contact manager software/module (144) housed on the system server, and the contact manager software/module (166) housed optionally on the client server provides functionality for the system server to conduct the contact maintenance features of the present invention. Features may comprise, for example, automated updating of contact information, as well as designating and changing levels of permission for designating the types of personal information exchanged between users on an individual basis.

The system's database 150 stores contact information for each of the registered users, such as users' profiles and their designated contacts, sent invites, received requests, permission level for each contact, etc. . . . In an alternative embodiment of the present invention, the user files are stored on the disc 126 of the system server. In a preferred embodiment of the present invention, the user is able to access the database files stored on the system server or client server via the contact builder software or software module 142 or 164, and the contact management software or software module 144 or 166 under the operational control web server software 140 residing on the system server. The software application(s) 164, 166, which are downloadable and installable from the WWW or other communication channels, allows the user to log into and display information downloaded from server 120. In a preferred embodiment of the present invention, the server database files comprise a list of registered users of the contact manager service. By way of exemplification, types of information that may be stored for each registered user include: user's name, title, company, availability status, photo, phone numbers, email addresses, fax number, websites, birthdates, anniversaries or other special dates, and preferred modes of communication. The database will also contain a contact table that relates users to each other. Each record in the table represents a relationship between one user and another with certain permission levels set by each user to establish types of their personal information available to each other.

Figure 2C:
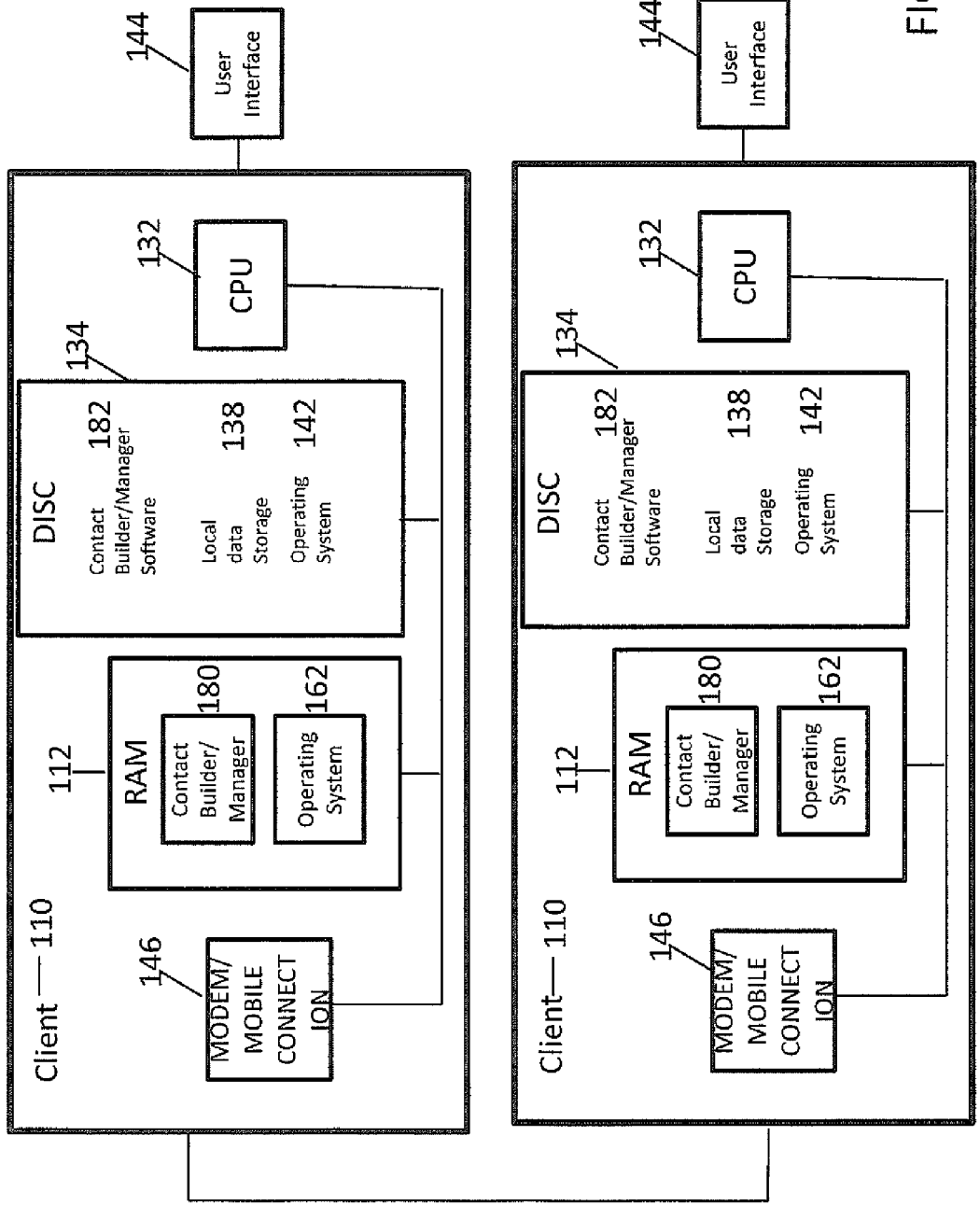
FIG. 2C is a detailed block diagram showing an alternative peer-to-peer configuration of the present invention.

As shown in FIG. 2C, peer-to-peer (p2p) is an alternative system configuration of the present invention, wherein registered users communicate directly with each other, versus through the system server. The system configuration would comprise multiple users' (i.e., client) computers or mobile communications devices in direct communication, wherein each comprises a hard disc with a contact builder and manager module 182. The module may comprise a computer readable medium with instructions stored therein for exchanging contact information with another client computer or mobile communications device that houses a contact builder and manager module 182, compatible module and/or database. The system would further comprise each disc under the operational control of random access memory with contact builder and manager functionality 180. Other embodiments of the present invention for peer-to-peer contact building and management exchanging capacity with cross referencing functionality and one click selections would be readily apparent to the artisan.

Personal Computing Devices: In an alternative configuration, in which the client has a Personal Computing Device, such as an Apple iPhone or Personal Computer with a contact database, a user is able to synchronize their user contact information to their Personal Computing Device's Contact database through an importation and synchronization function performed by the contact manager software. The synchronization operation is performed unidirectional (server to client). Or in another alternative embodiment, the device synchronization may be bidirectional (client to server or server to client). The server contact manager software will communicate, via a connection, with the Personal Computing Device's contact software of the user's contacts, and, in accordance with the permission scheme described herein, synchronize the database to the contact's Personal Computing Device contact software.

Figure 3A:
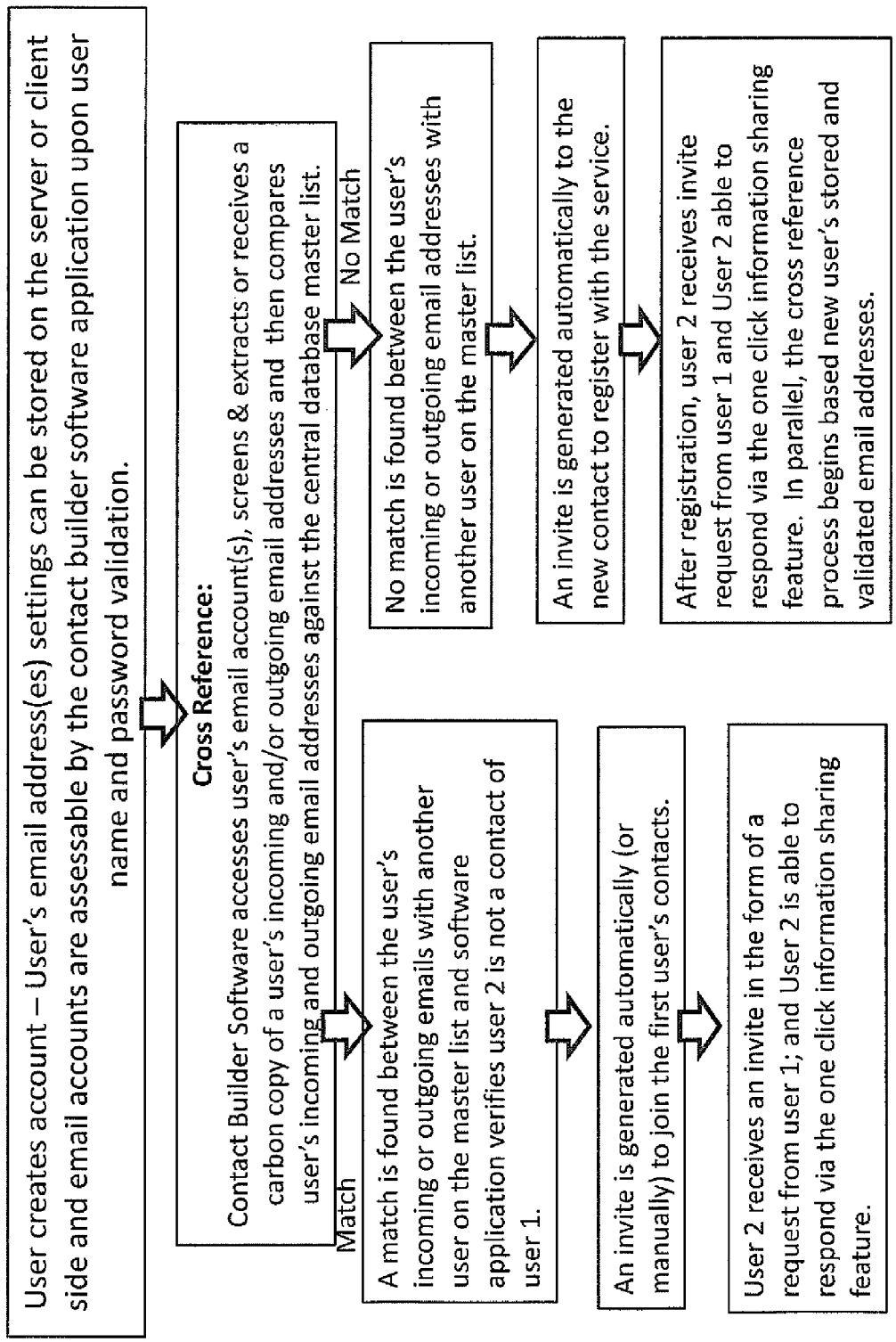
FIG. 3A is flow chart of a cross reference feature used for inviting a new contact.

Contact Builder's Cross Referencing Module:

The cross referencing and invite feature of the present invention contact builder comprises an automatic email "cross reference" feature, as shown in FIG. 3A, that identifies new contacts made by the user that they may wish added to their contact list. The present invention comprises a computer-readable medium having computer-executable instructions for identifying a contact that a user may desire to add to their contact builder database, the method comprising: screening, extracting and/or carbon copying a user's incoming and/or outgoing email addresses from time-to-time that are stored on a server or client computer to a contact to identify whether said contact is a member of a registered user's contact database; and determining if said contact has a user file stored on the system database. If the contact does have a file, then the system may notify the user via electronic communication of contact's status as a potential addition to said user's contact database. But, if the contact does not have a file, then the system server may automatically generate an electronic communication to the contact to invite him/her to register on the system server. Once the contact has registered as a new user, the system may subsequently notify the user of the contact's status as a potential addition to the user's contact database file. The computer-implemented method may furthermore comprise the user transmitting via electronic communication to the newly registered contact, an invitation to exchange personal contact information. The invitation may specify the type of the user's personal information they wish to exchange with that particular contact: home, work, or both home and work contact information (if available). The (newly) registered contact would respond to this invitation by specifying the type of their personal information to exchange with the user: home, work, or both home and work contact information (if available); or by declining said invitation. They would decline by selecting the "delete" function, and their email would be removed from the user's queue of sent invitations awaiting a response. The user may or may not receive a message specifically stating that their invitation was declined.

Figure 3B:
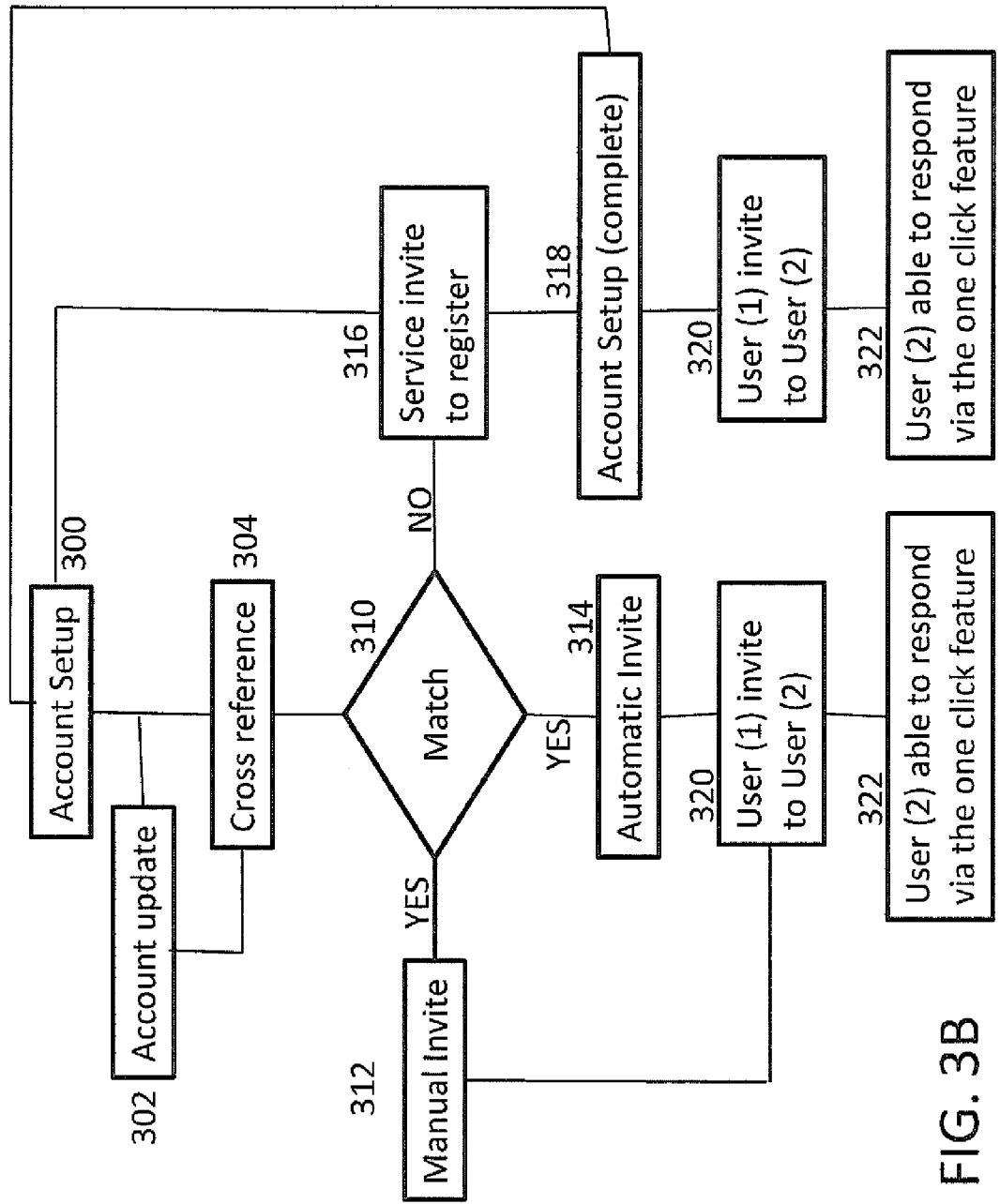
FIG. 3B is a detailed data flow diagram of cross reference feature used for inviting a new contact.
Figure 4A:
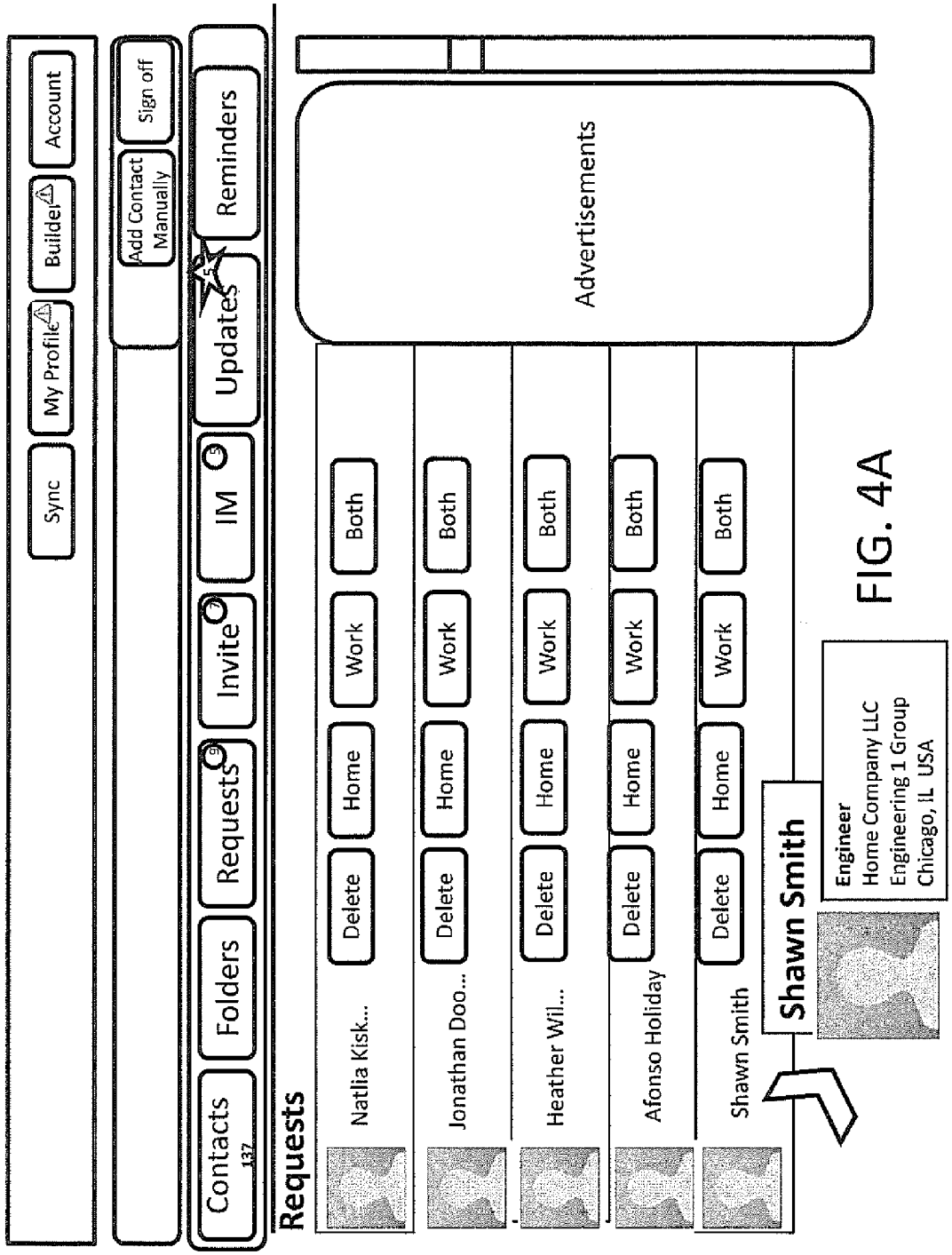
FIG. 4A is an illustration of the "one click" feature for receiving requests from another user to exchange information.

The cross referencing and invite feature of the present invention is also demonstrated in the flowchart of FIG. 3B. During user account setup 300 when the user creates their account with the contact manager service, or thereafter while updating their account 302, the settings for the user's email address(es) are stored on the server and/or on the user's computing device. The user's email address(es) login credentials may or may not be stored on the server and/or on the user's computing device. Then the Contact Builder "cross reference" function 304 of the service operates automatically accessing the user's registered email accounts from time to time for new contacts. The contact builder software application will access the user's email account(s), on an ongoing or temporary basis that are hosted by an email service, server or client computer, and locate and extract or receive a carbon copy of a user's incoming and/or outgoing email addresses and then compare, or "cross reference" the user's incoming and/or outgoing email addresses with the central contact database hosted on the server to determine if there is a match 310. If user(1)'s incoming and/or outgoing email addresses exist in the central contact database (match) during the email cross reference process and are not already a contact of the user(1) (new contact), then an invite to exchange information is sent to the user(2). User(2) receives it as a "request" to exchange information if user(2)'s information is set to "private". For example, FIG. 4A illustrates user (2) receiving requests to exchange contact information with five other registered users.

If user(2)'s information is set to "public", then the exchange of information is completed without user (2) needing to take action.

Figure 4B:
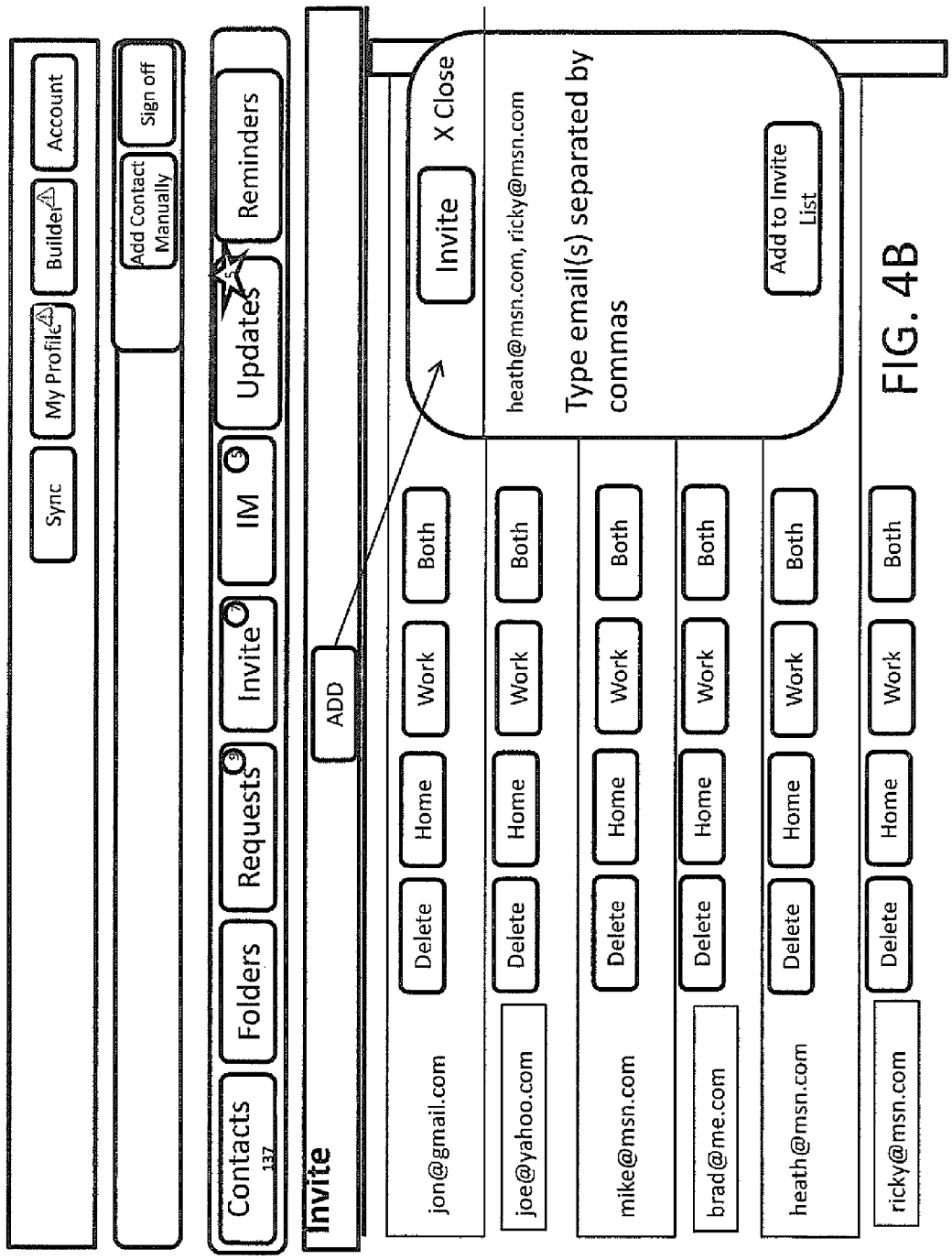
FIG. 4B is an illustration of the "one click" feature for inviting a new contact to exchange information.

Contact Builder Invite & Response Feature: The contact builder system's invite feature has two settings, as shown in FIG. 3B: 1) the manual invite 312 setting (aka contact builder "off"); or 2) the automatic invite 314 setting (aka contact builder "on"). If the contact builder is "on", then the invite along with the predetermined assigned permission is sent to a new contact automatically. If the contact builder is "off" and/or the user is manually sending an invite then all new contacts will be queued, for example, in an invite list after the Contact Builder software application executes the cross reference process. The user may be notified of how many invitees are on the user's "Invite" list (See FIG. 4B), which comprises new contacts determined by the cross reference process awaiting an invite from the user. The user will need to execute the "one click" permission level invite button for each contact so as to complete the invite process. After the user selects the permission level (i.e., Home, Work, Both), the invite process will proceed as described in FIGS. 3A & 3B. In addition, the user may manually add multiple invitees to the invite list simultaneously by entering (i.e. typing) multiple invitee emails separated by commas, then selecting the 'Add or Add to Invite List' function or key (FIG. 4B).

No Match: If the cross reference functionality determines that a contact does not exist in the central contact database, then an email (or an alternative electronic communication) is automatically sent to the new contact, i.e., user(2), to become a registered user of the service (FIG. 3B, 316). After registration 318, the user(2) will receive request(s) to exchange information with the user(s) that sent invite(s) if the user(2)'s information is set to "private". User(2) must take action to complete the exchange, as shown in FIG. 3B, 320. Action, my include by way of exemplification, user(2) having to indicate whether personal, professional or both contact information is made available to user(1), or to delete their request, all via the "one click" feature 322. Contrarily, if user(2)'s information is set to "public", then the exchange of information is completed without user(2) needing to take any action. Additionally, after registration and email account(s) validation to ensure that user(2)'s email address(es) are valid, then the contact builder system will access the email account(s), on an ongoing or temporary basis, locate and extract or receive a carbon copy of the user's incoming/outgoing email address(es) and cross reference user(2)'s incoming and/or outgoing email addresses 304 to implement the invite process as described herein.

Additional "Invite" Features: When a user logs into their account (FIG. 4A), and if the contact builder is or was set to OFF, invitees may appear on the user's "Invite" list, which comprises entities awaiting an invite from a user. For example, if the contact builder is OFF and/or the user is manually sending an invite (FIG. 4C), then all invitees will be queued in the invite list (FIG. 4B) and user will need to one click the permission level invite button for each contact so as to start the cross reference process (i.e., the one click process). After the user selects the permission level (i.e., Home, Work, Both), the cross reference process will proceed as described in FIGS. 3A & 3B. Also invite information will be stored in the server so follow up emails (or alternative electronic communications) can be sent to approve a request or become a registered user of the service. The server will store the invite until the cross reference has processed and the invitee has declined the invitation, or registered with the service and selected a permission level. A contact may have the option to block requests to exchange information with a particular user(s). The system will know not to invite the same contact twice if a request is pending by referencing the user's stored invite queries by methods well known in the art.

Designation of Privilege and Permission Levels: A user can designate the privilege level of their contact network for their contact information stored on the master database as either "private" or "public". It may be changed at any time. If information is set to public mode, a user may automatically have their contact information added to another user's contact list without their permission. Additionally, in the preferred embodiment of the present invention, the levels of permissions are as follows: home, work or both home and work. However, the present invention is not limited to the levels of permission shown in the preferred embodiment. One of skill in the art would readily know of methods to allow permissions categories to be modified as needed.

If a user's account is instead set by them to "private", then new contacts must "request" permission to exchange information with the user. The master database will subsequently send an "invite" automatically to the user (unless set to manual invite mode), and the user will be able to view how many requests are waiting for their response and by whom. For example as shown in FIG. 4A, a user has received nine requests to join other registered user's contact lists, and they have seven invitations for "one click" action (manual mode). The user may also view a short profile of the requestor before deciding whether to accept them as a contact.

"One Click" Feature for Manually Sending Invitations and Responding to Requests:

As disclosed in FIGS. 3A & 3B, a user may manually send an invitation to a contact to join their network or have the system automatically generate an invitation. The present invention also comprises the enhanced feature of sending an invitation with a selected type of information disclosure in "one click", thus not requiring to also select "submit". Therefore, the present invention comprises, a computer implemented method establishing a communication connection between users of a networked based contact management system, comprising: under control of a first user client computer, notifying a first user on a graphical user interface of a second user registered on the server system that said first user has previously exchanged electronic communications with after a cross reference function has been performed. In response to only a single action being performed (i.e., one click or touch of the user input device), sending an electronic message from said first user to said second user, wherein the message may be an invitation to join their contact network. Then under control of the system server, extracting a first user's contact information from said system server database, forwarding said message and contact information to said second user. And then under control of a second user client server, viewing by second user on a graphical user interface of said message and information from said first user, and in response to only a single action being performed by said second user (i.e., one click or touch of the personal computing device keyboard or peripheral device), and sending a response to said message to the system server. Additionally, wherein when the system notifies a first user of a second user registered on the server system it may disclose said second user's identity information comprising but not limited to: name, photograph, job title, employer, and/or geographical location. And, wherein said message is an invitation from said first user to said second user to exchange contact information by linking said users' server system accounts, and when the system notifies a second user of a first user's request to exchange information, it may disclose said first user's identity information comprising but not limited to: name, photograph, job title, employer, and/or geographical location. The computer implemented method further provides a "one click" function for the invitee to respond to the request (i.e., invitation): the second user declines said invitation with said single action of selecting the delete function, and the system server deletes the second user's email address from the first user's client server database; or, the second user accepts said invitation with said single action of selecting a function representing the type of contact information to disclose to said first user selected from the group consisting of: home, work, or both home and work. Additionally, the computer implemented method permits the first user selecting the type of contact information to disclose to said second user with the single action of selecting a function and submitting said message to the server system in one action, wherein the type of contact information is selected from the group consisting of: home, work, or both home and work. Therefore, in "one click" a user may send or respond to an invitation while concurrently designating the type of personal information they wish to exchange with the contact (i.e., home, work or both).

The "one click" feature also works when the user has set the system to issue automatic invitations when a cross reference procedure has identified a match between a user and one of their contacts, who is also a registered system user. Therefore, the present invention also comprise a computer implemented method for establishing a communication connection between users of a networked based personal contact management system, comprising: under control of the system server, identifying a first user electronic communication with a second user registered on the database of said server, extracting a first user's contact information from said system server database, and forwarding an electronic message and contact information to said second user. Then under control of a second user client server, viewing by second user on a graphical user interface of said message and information from said first user, and in response to only a single action being performed by said second user (i.e., "one click" response), sending a response to said message to the system server. The message may be an automated invitation from said first user to said second user to exchange contact information by linking said users' server system accounts. Wherein when the system notifies a second user of a first user request to exchange information, the contact builder may disclose said first user's identity information comprising but not limited to: name, photograph, job title, employer, and/or geographical location. The second user may decline the invitation with said single action of selecting the delete function, and the system server deletes the second user's email address from the first user's client server database. Or, the second user may accept the invitation with said single action of selecting a function representing the type of contact information to disclose to said first user selected from the group consisting of: home, work, or both home and work.

Figure 5A:
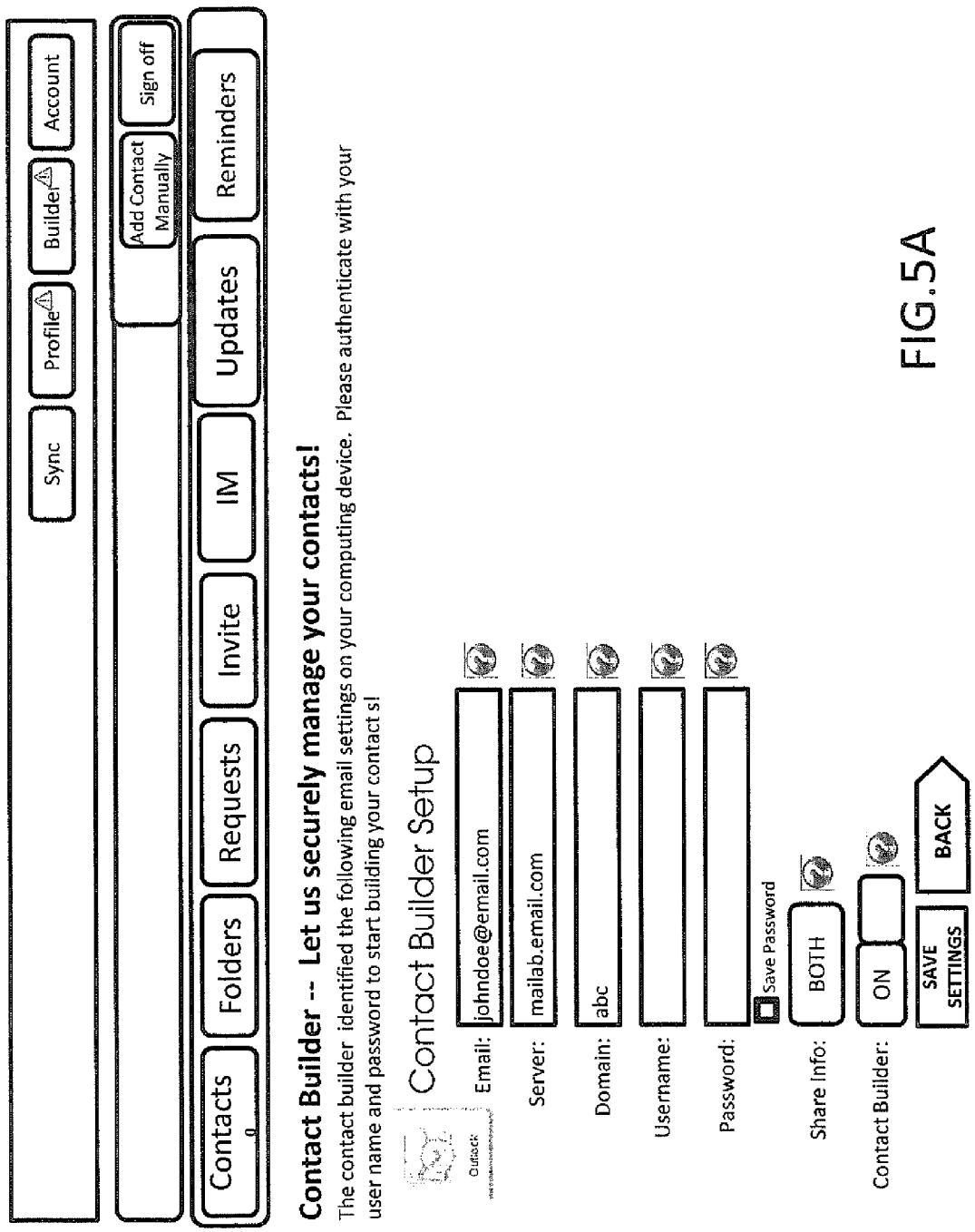
FIG. 5A is an illustration of the contact builder automatically detecting email settings.
Figure 5B:
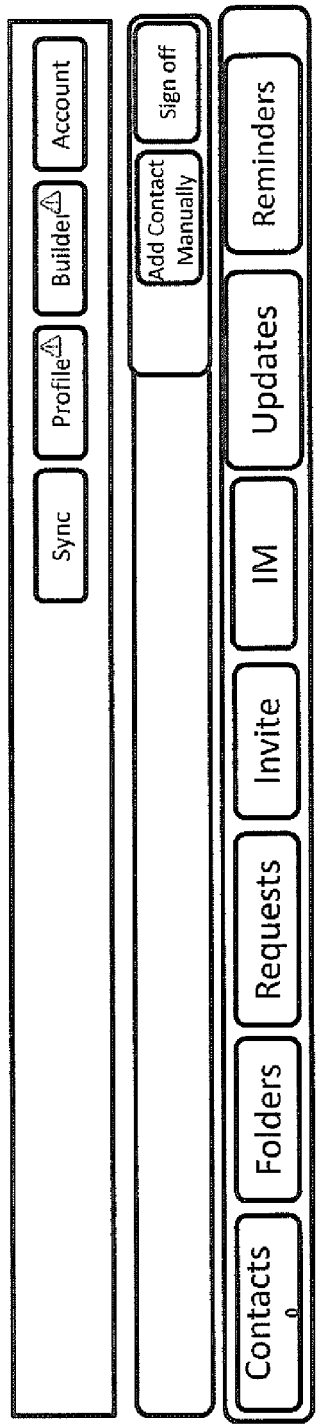
FIG. 5B is an illustration of one type of notification to add an email account to the contact builder.
Figure 5B:
Figure 5C:
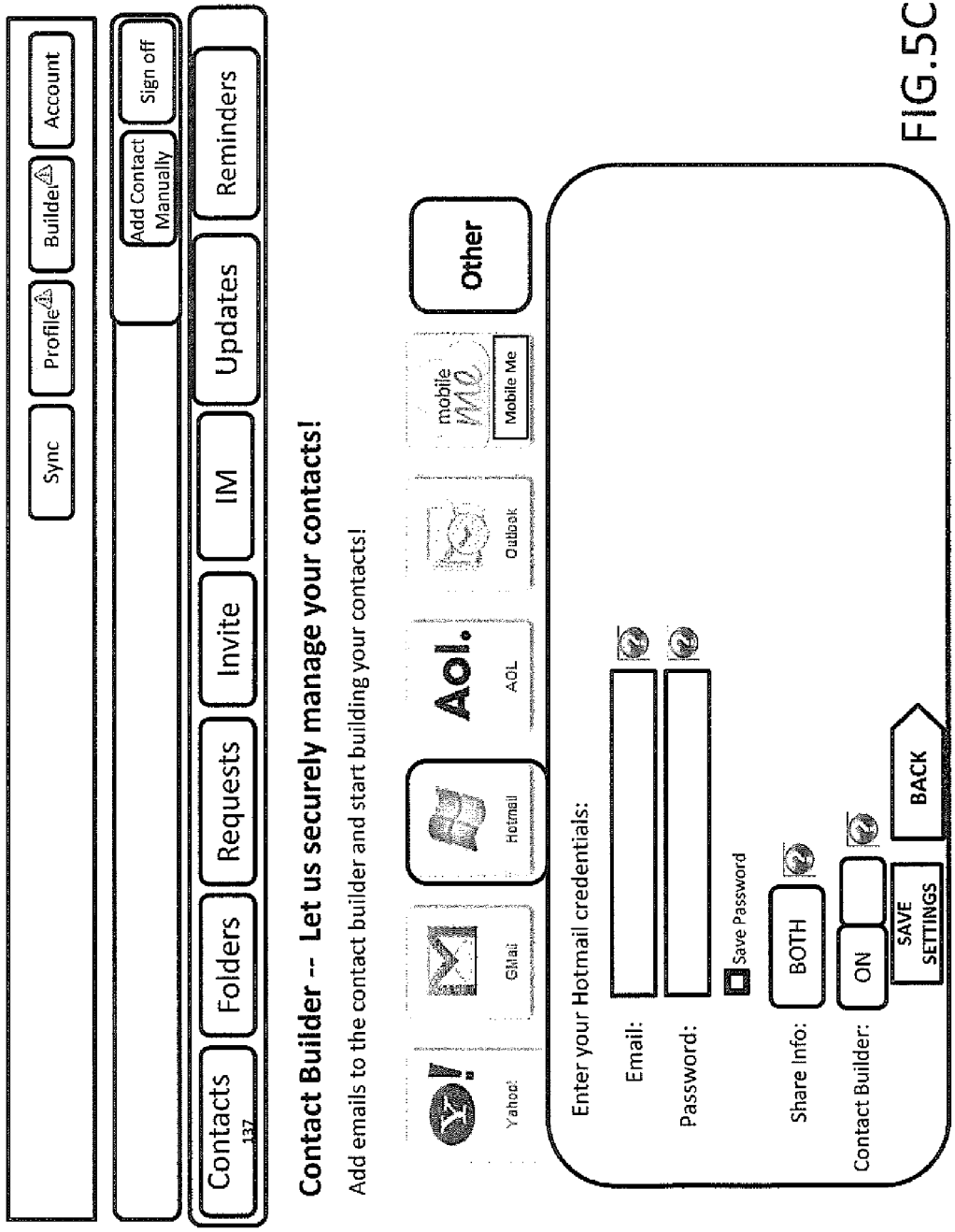
FIG. 5C is an illustration of manually adding email settings to the contact builder.
Figure 5D:
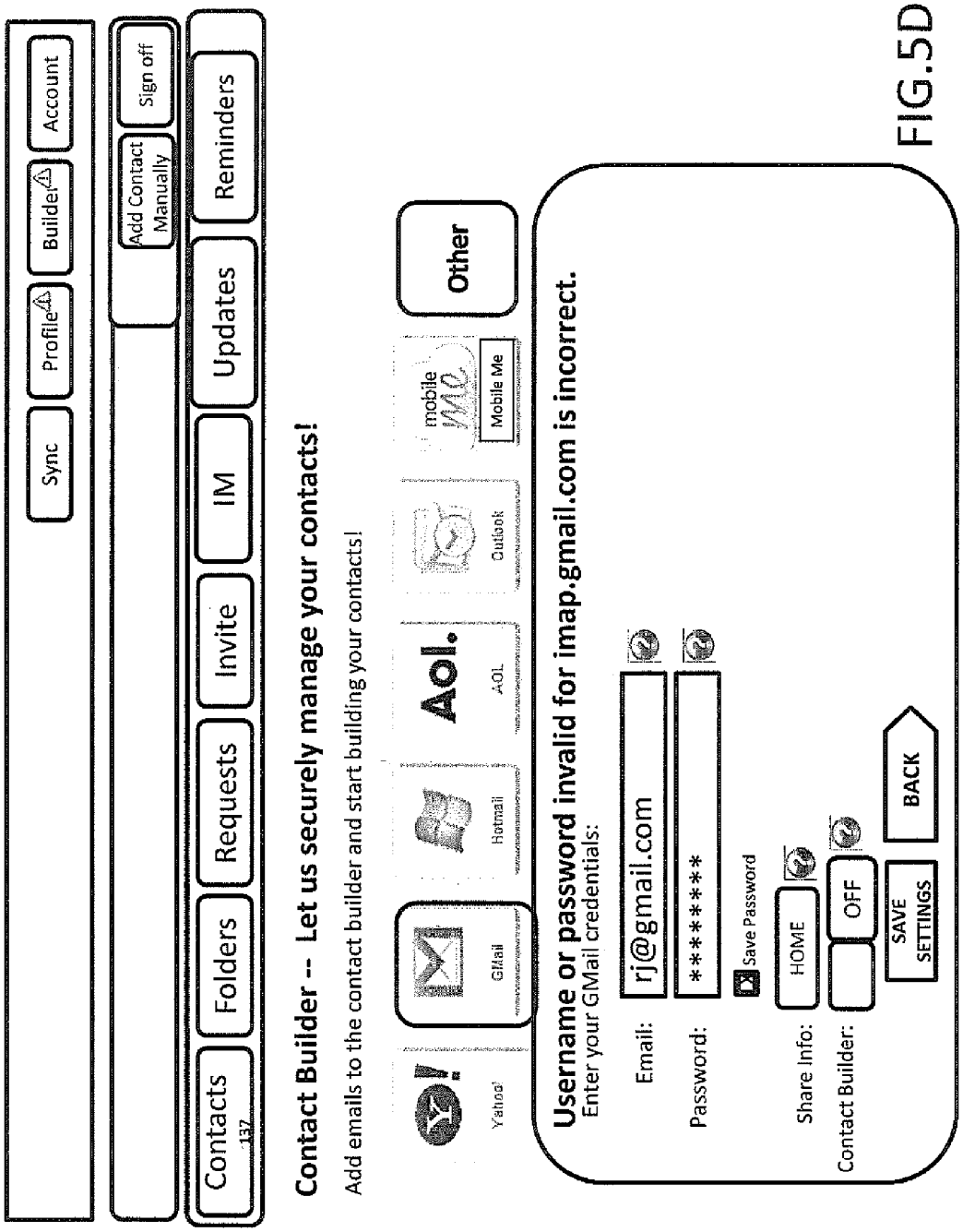
FIG. 5D is an illustration of one type of error message the user will receive if they enter an invalid credentials.
Figure 5E:
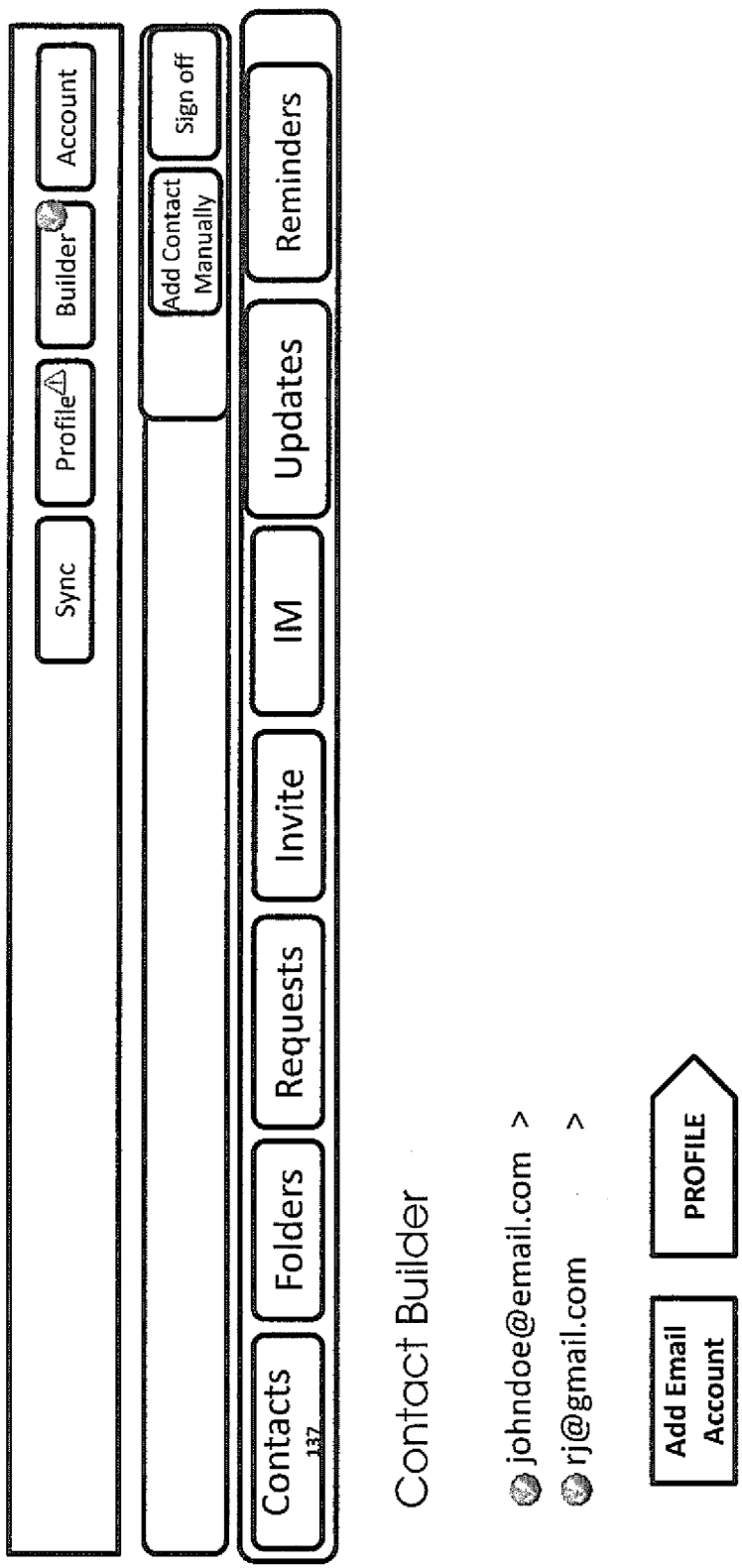
FIG. 5E is an active status illustration of the of the user's contact builder email account(s) settings. No action is required for their email accounts.
Figure 5F:
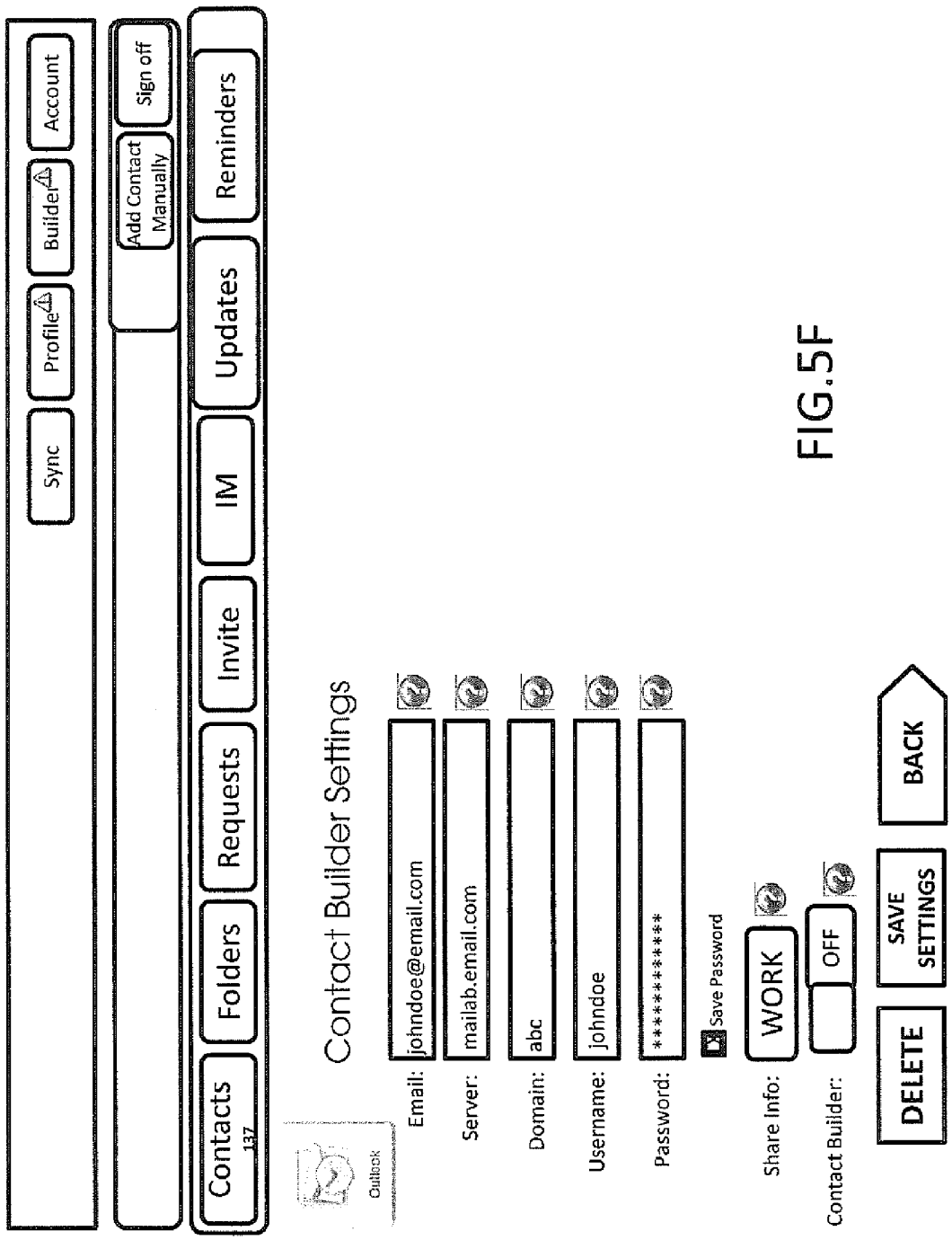
FIGS. 5F-H are an illustration of the contact builder settings: contact builder on/off, share level of work, home or both, save password check box and a delete email account, save settings and a back button.
Figure 5G:
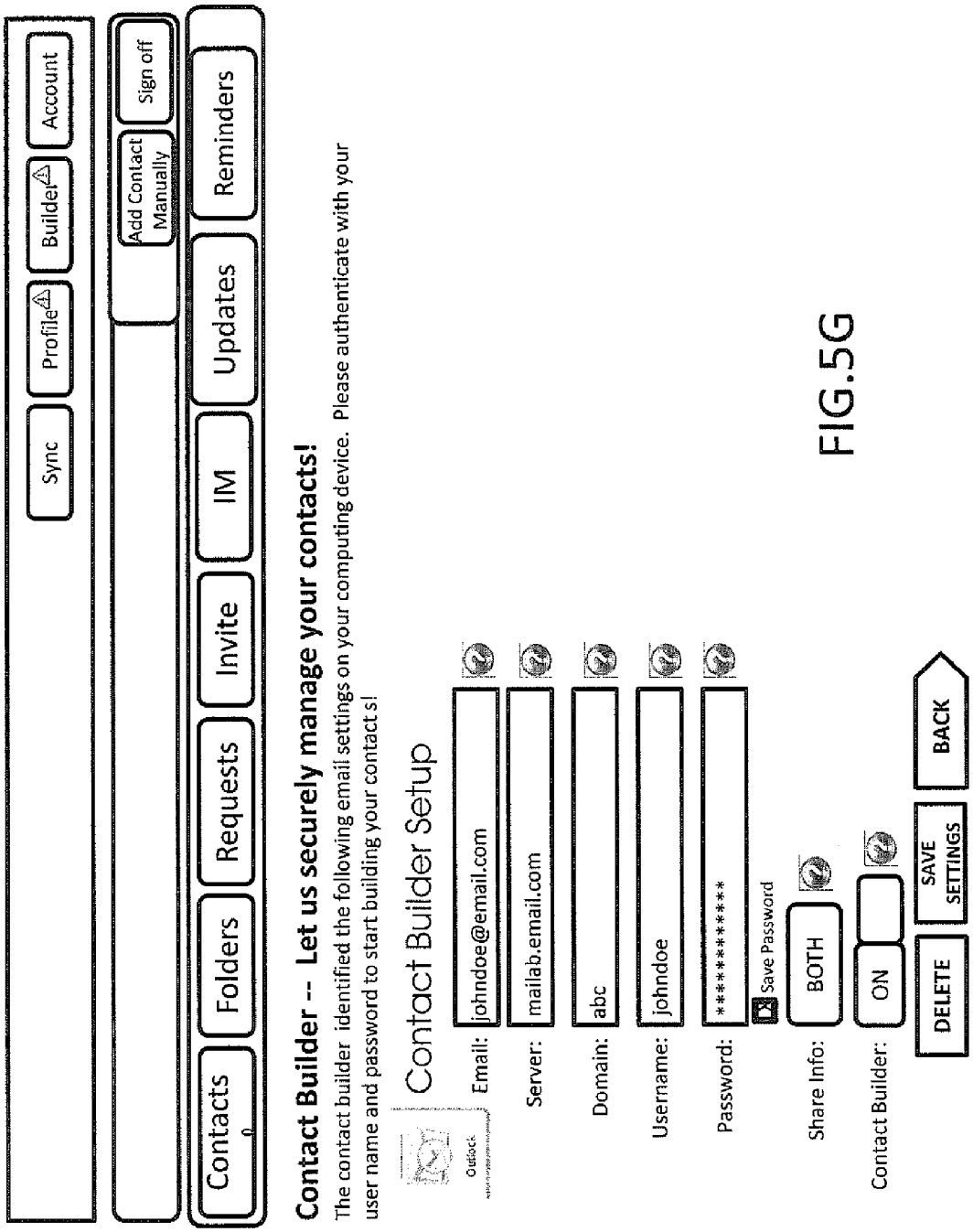
Figure 5H:
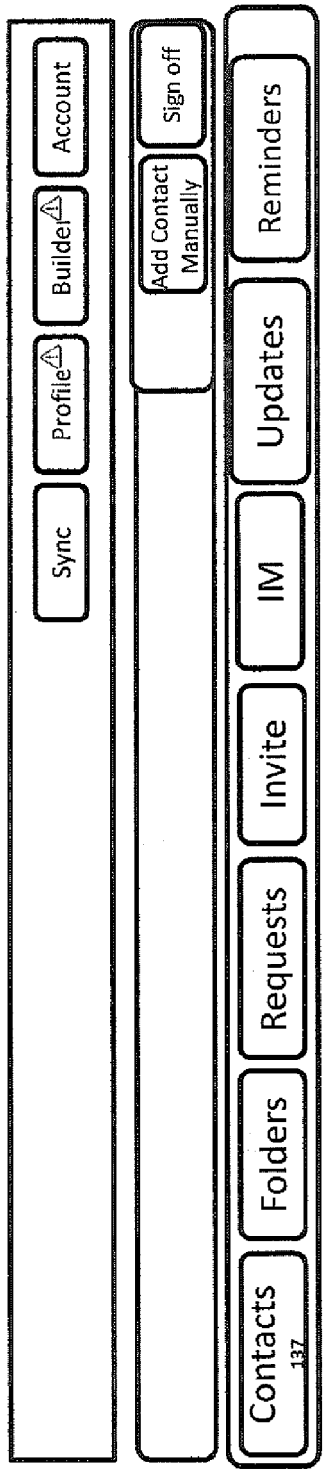
Figure 5H:
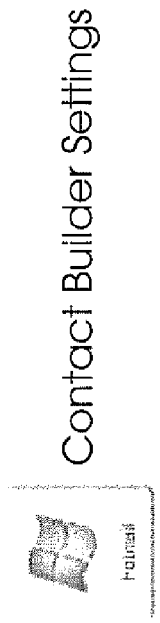
Figure 5I:
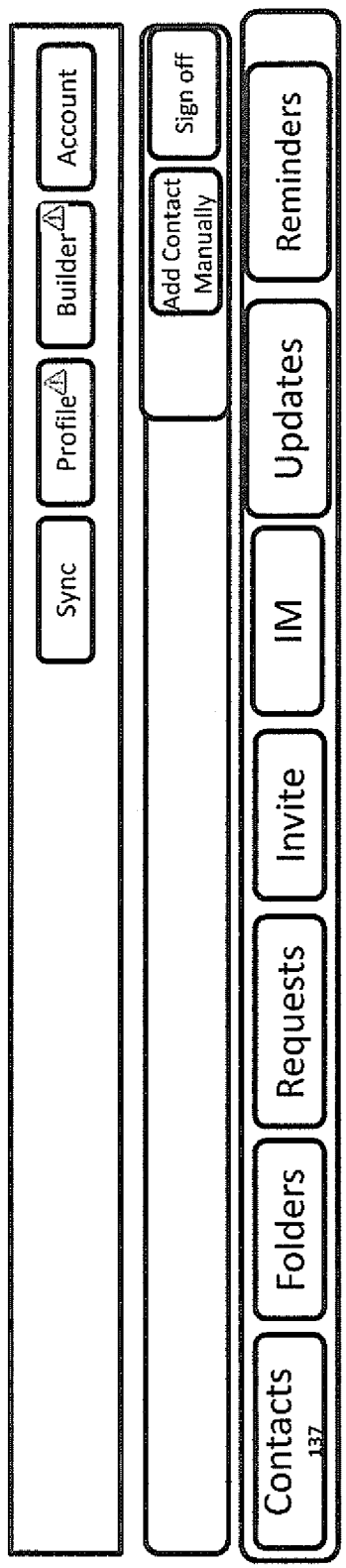
FIGS. 5I-J are non-active status illustration of the of the user's contact builder email account(s) settings. User must take action and confirm their credentials.
Figure 5I:
Figure 5J:
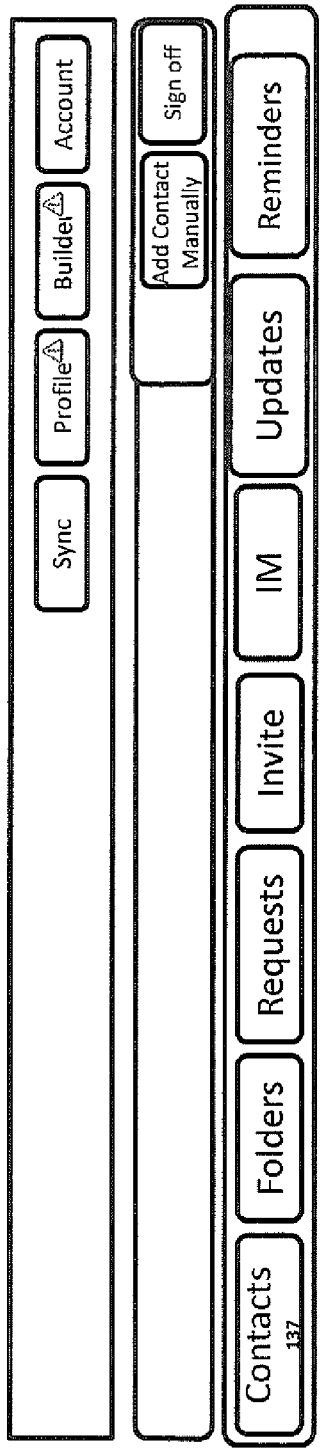
Figure 5J:

By way of exemplification, FIG. 1 compares the "two+ click" method of the prior art, versus the "one click" method of the present invention as illustrated in FIGS. 4A & 4B. FIG. 1 discloses a prior art process of a user selecting the various levels permission, information, and notification and then hitting "submit", which as exemplified requires five clicks of the user's input device. In comparison, the present invention, as shown in FIGS. 4A & 4B disclose the enhanced feature of permitting a new user to designate with "one" click, key stroke, touch of the pad, or other data entry methods well known in the art of computing devices, whether to accept or deny another user being added to their list of contacts while also designating the level of personal contact information to exchange. This feature occurs when the system is processing an "invite" or a "request" from one user to another. For a user to deny a request from another user, or to omit an invitation they have submitted to another user, they select the "delete" button located next the other user's name (FIG. 4A). If they choose to accept that new user be added to their list of contacts, they must then decide what level of permission, or access, they wish to grant the requestor. As shown in FIG. 4A by way of exemplification, the invitee can designate the access level with one click to either the "home", "work", or "both" (meaning home and work) contact information computing device input key. Work information would comprise, for example: telephone number, organization, title, city, state, and country, and email address. Home information would comprise, for example: landline or mobile phone number, fax, street address, city, state, and country, and email address. A user's default setting is "both", as shown in FIG. 5A. The request to exchange contact information will also remain on the list until the user makes a selection of: "delete", "home", "work", or "both".

Upon acceptance by the user of the request, both user's will have access to the other's contact information for only the level of access that was granted by each invitee to each requestor. For example, the invitee will grant access to the requestor for only their "work" contact information, while the requestor grants their invitee access to only their "home" contact information. If a user wishes to change the level of permission, or access they have previously designated to another contact, they may re-select on the contact's profile page via the one click permission feature.

FIGS. 5A-5J demonstrate additional features of the present invention. For example, when a user adds an email address to the contact builder, then the software application will validate the email address by accessing the account based on the email account settings and login credentials. If the software application cannot gain access to the email account, then the user will receive an error message on their mobile communications or computing device. For example, the message may state: "Cannot get Mail—the user name or password for [email address] is incorrect" (FIG. 5D) and/or an error symbol icon.

Figure 6A:
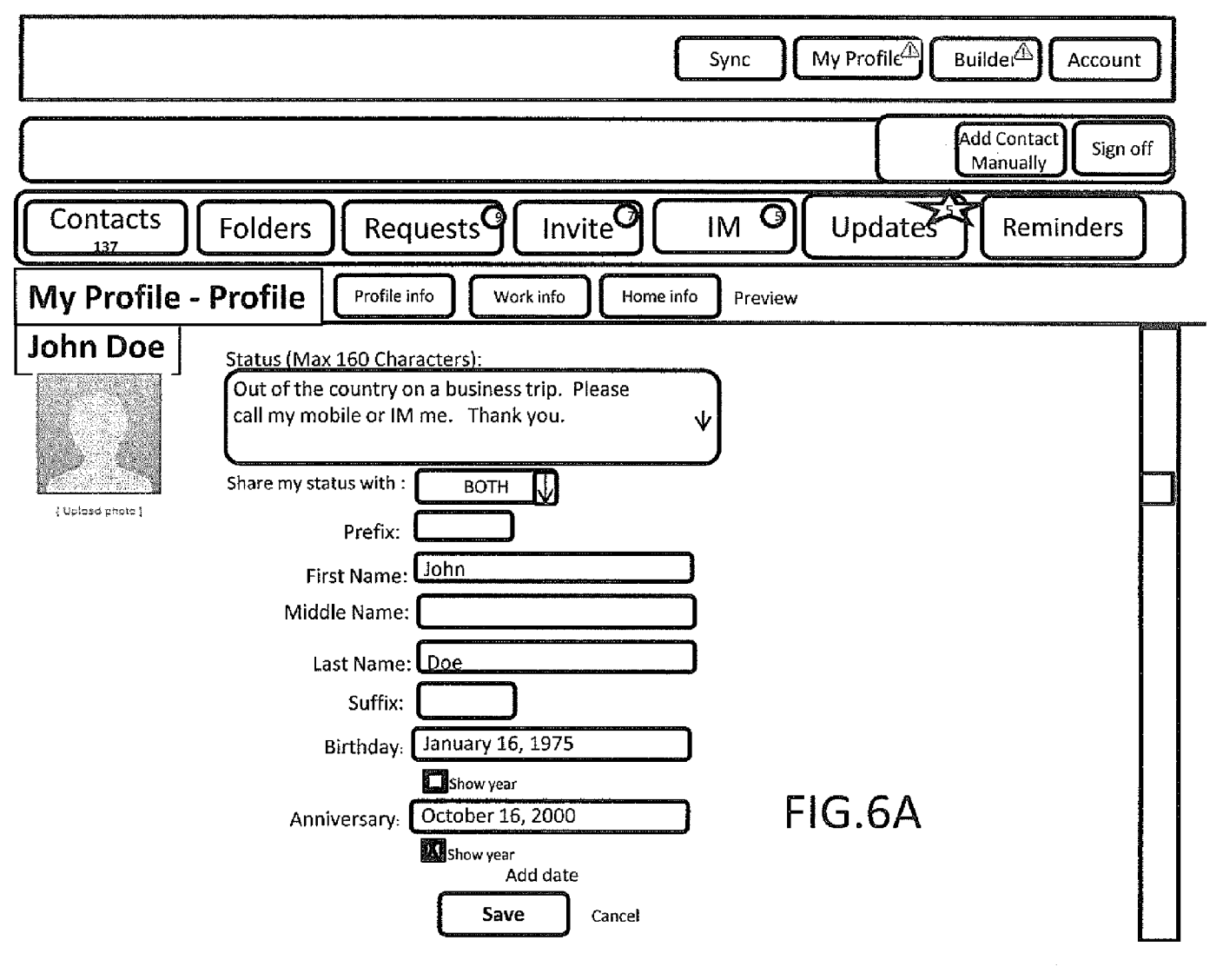
Figure 6B:
FIG. 6B is an illustration of the user's work profile with a "public" privilege setting. "Private privilege" level is also an option (not shown).
Figure 6C:
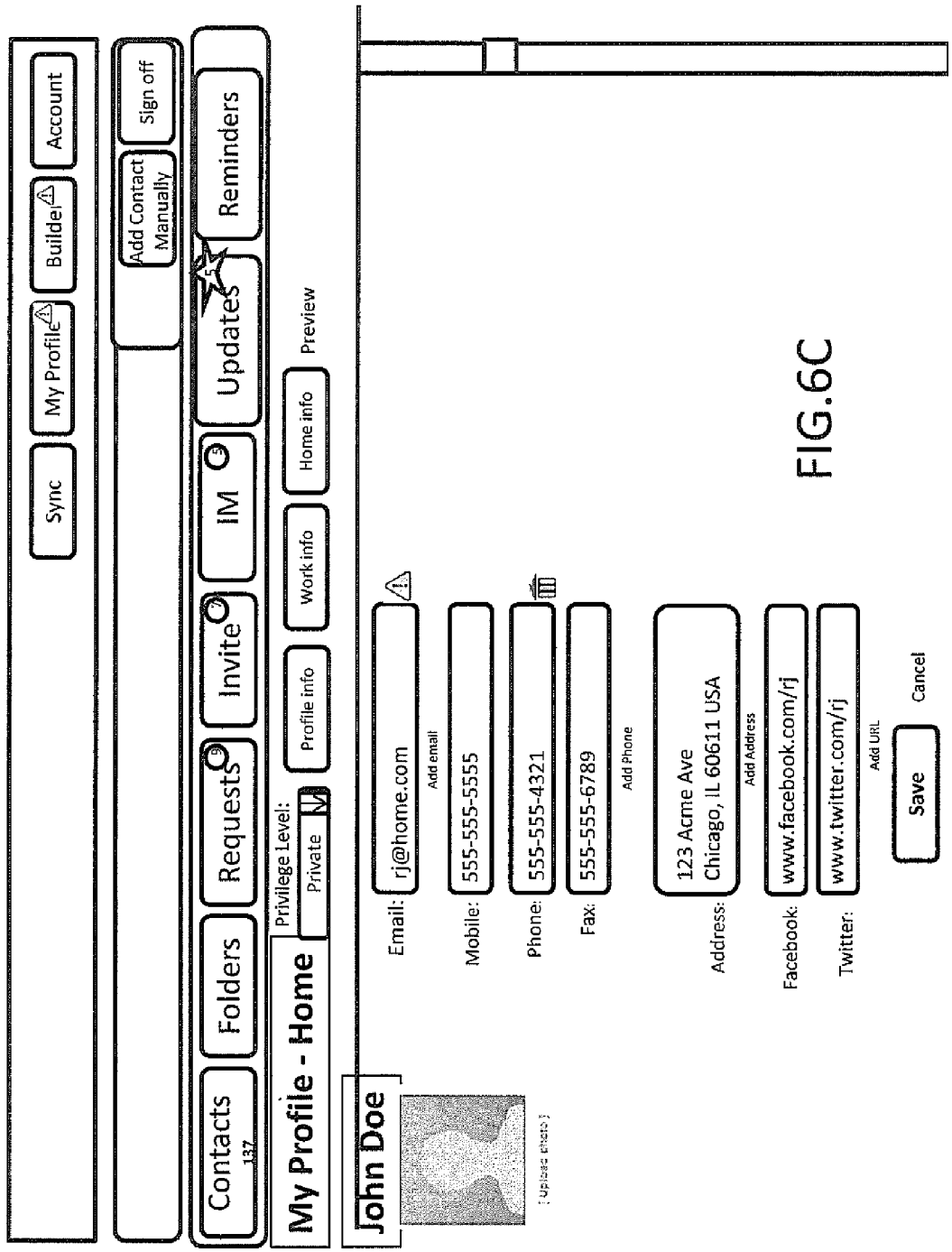
FIG. 6C is an illustration of the user's home profile with a "private" privilege setting. "Public privilege" level is also an option (not shown).
Figure 6D:
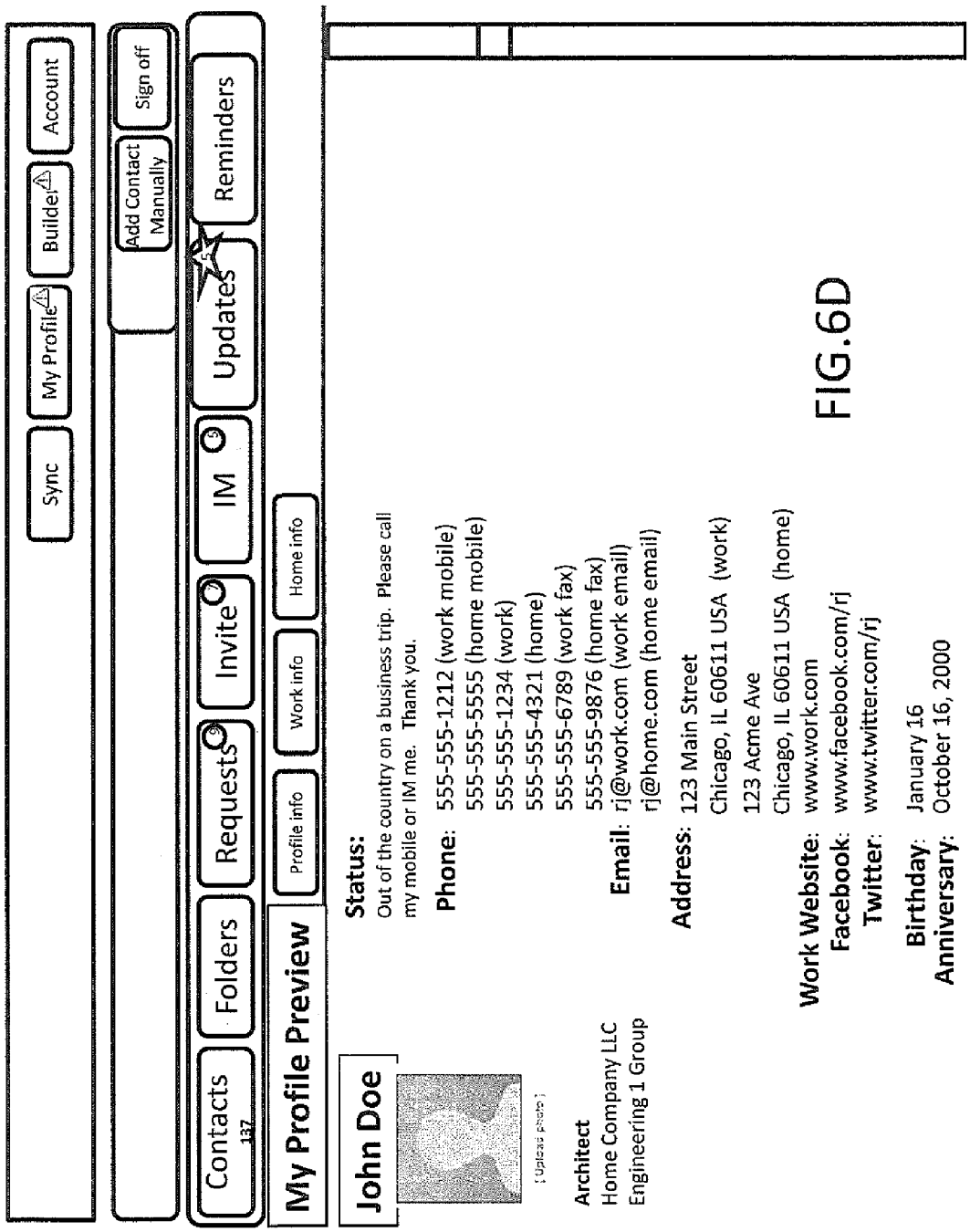
FIG. 6D is an illustration of a user's profile preview of all of entered contact information.

FIGS. 6-7 provide further exemplifications of the present invention, to include: a user's master profile; a user's work profile with a "public" privilege setting; a user's home profile with a "private" privilege setting; a user's list of contacts; and one contact's information as it is disclosed to the user.

FIG. 6A is an illustration of the user's master profile. The user's master profile may consist of but not limited to the user's name, availability status, birth date, anniversary or other special dates.

FIG. 6B is an illustration of the user's work profile. The user's home profile may consist of but not limited to the user's company, division, title, telephone and fax numbers, street address, email, URL and/or preferred modes of communication with the ability for multiple entries. In addition, FIG. 6B illustrates the one click privilege function in which the user can set the work information to public or private any time with "one click."

FIG. 6C is an illustration of the user's home profile. The user's home profile may consist of but not limited to the user's telephone and fax numbers, street address, email, URL and/or preferred modes of communication with the ability for multiple entries. In addition, FIG. 6B illustrates the one click privilege function in which the user can set the home information to public or private any time with the "one click" feature.

Figure 7A:
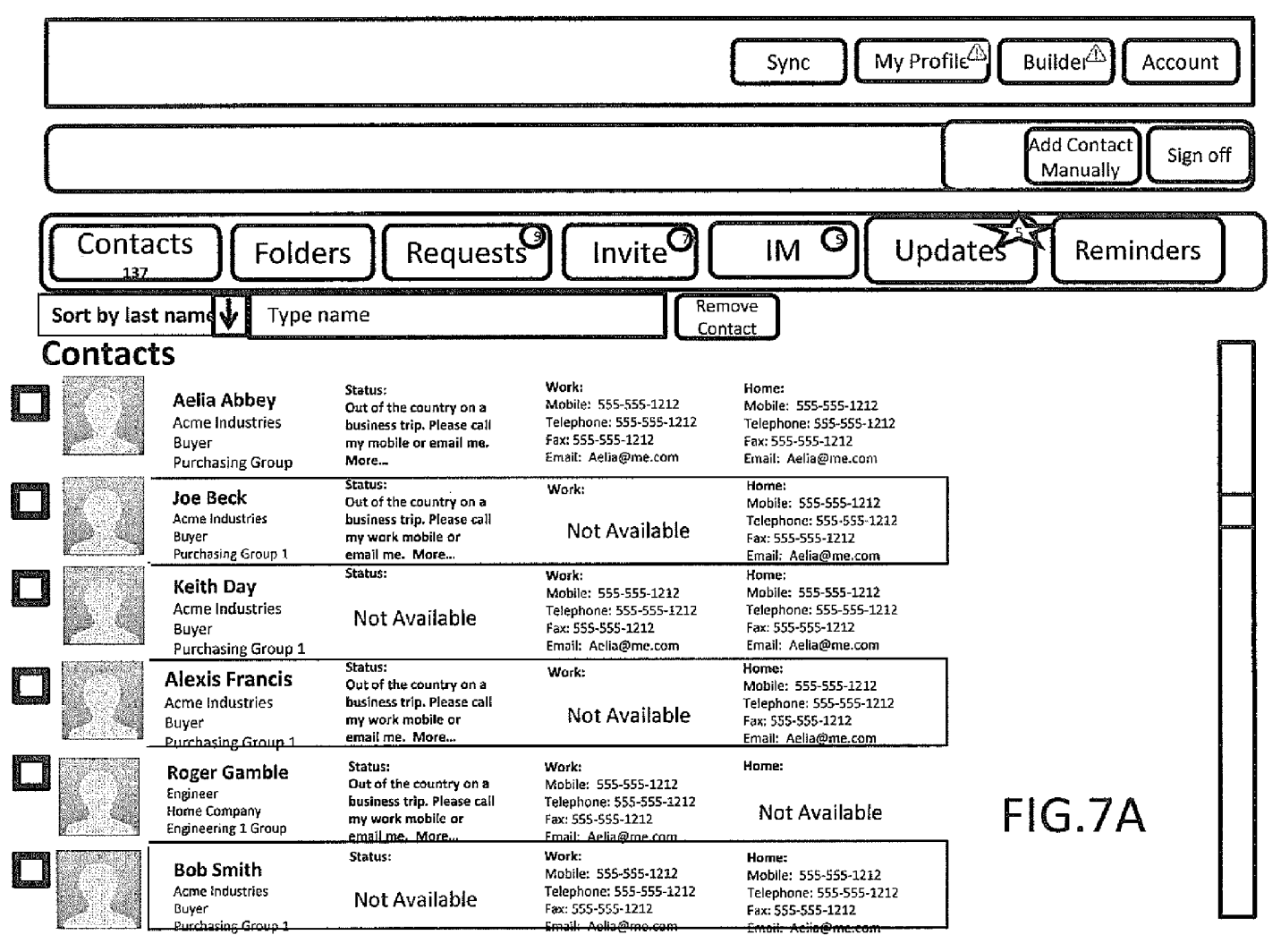
Figure 7B:
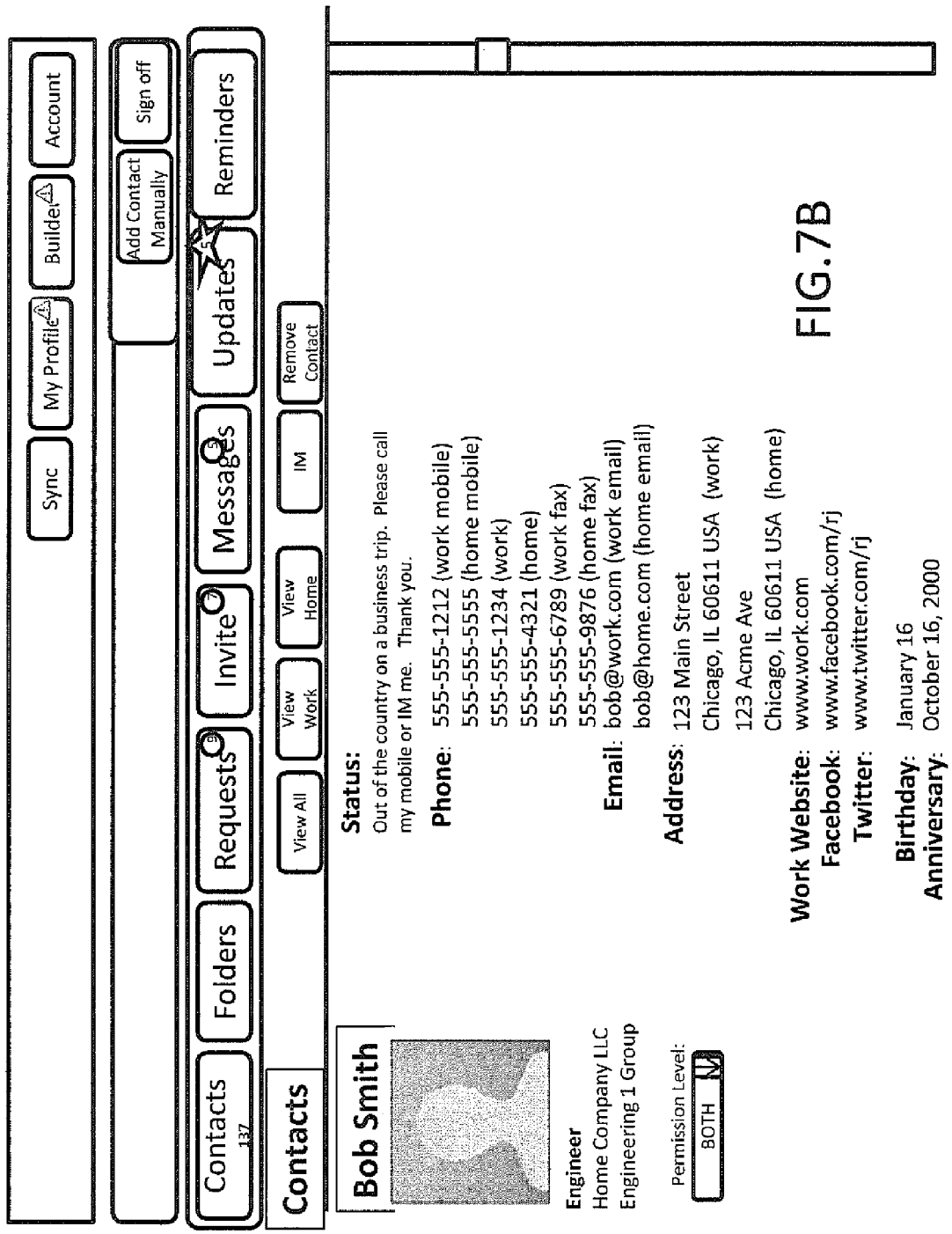
FIG. 7B is an illustration of a user's contact information, which is viewed by executing a selection of said contact from the list exemplified in FIG. 7A.

FIG. 7A is an illustration of a user's list of contacts. A user can view any contact by executing a selection. FIG. 7B is an illustration of a user's contact. A user can view specific information of the contact as granted by the contact. In addition, FIG. 7B illustrates the "one click" permissions function in which the user can change the contact's permission level, for example home, work or both, at any time with the "one click" permissions feature.

Updating Contact Information

Contact Information Updates: Any saved changes made to an user's information (i.e. email addresses, phone numbers, fax numbers, mailing addresses, etc. . . . and/or their personal information) will be stored and maintained on the central database and immediately accessible by the user's contacts. The user's contacts may be notified of a change in contact information.

In a preferred embodiment of the present invention, a user adds new contact information such as a new email address to their profile while logged into the contact manager system, which is sent via the WWW to the contact manager system running on server. The system server immediately adds the email address to the user's other addresses and sends notification of the update simultaneously to all the user's contacts, as well as back to the user. All of the user' may see the notification after the sign-in page. Additionally, if a user has a personal computing device that is synchronized with the database located on server via contact software on the user's personal computing device, then as soon as the server's database is updated with the new address, the personal computing device contact database will be updated. This method will not require the manual acceptance or denial of the update from the personal computing device.

A user may also make updates to their contacts' information that was obtained independently (i.e., a face-to-face meeting) by entering the information on their mobile or computing device while they are logged into the contact manager service. The contact may receive notification from the server that a request has been made to update their information on the master database, asking them to accept or deny this change. Assuming they accept, if another contact has access to this type of information in accordance with their permission level, then they may be sent a notification that an update has been made to this contact's information.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for permitting exchange of contact information between a plurality of users in a network-based contact management system, comprising:
    accessing, by a system server and over a network, an electronic communication account associated with a first user of the plurality of users;
    obtaining, from the first user's electronic communication account, electronic identifier information for at least a second user of the plurality of users;
    identifying, in a database associated with the system server that stores central contact information for the first user, whether at least a portion of the second user's electronic identifier information is included in the first user's central contact information;
    identifying predetermined settings set by the first user;
    if at least the portion of the second user's electronic identifier information is not included in the first user's central contact information, generating, for the second user, a request to exchange contact information with the first user, wherein the request is transmitted according to the first's user's predetermined settings by one of:
        automatically transmitting the request by the system server to the second user without input from the first user; and
        transmitting the request by the system server only upon receiving input from the first user; and
    receiving, from the second user and at the system server, a one-click response to the request to exchange contact information, wherein the one-click response specifies one of the following actions:
    a delete of the request to exchange contact information with the first user;
    an exchange only home contact information action with the first user;
    an exchange only work contact information action with the first user; and
    an exchange home and work contact information action with the first user and wherein, in the event of an exchange of contact information, the one-click action further specifies information pertaining to whether at least one of phone, email or address are to be exchanged.

2. The method of claim 1, wherein when the request is transmitted by the system server only upon receiving input from the first user, the input from the first user generated in response to only a one-click action being performed by the first user.

3. The method of claim 2, wherein the one-click action by the first user specifies one of a delete request to exchange contact information action, an exchange only home contact information action, an exchange only work contact information action and an exchange home and work contact information action and wherein, in the event of an exchange of contact information, the one-click action further specifies information pertaining to whether at least one of phone, email or address are to be exchanged.

4. A method for permitting exchange of contact information between a plurality of users in a network-based contact management system, comprising:
    accessing, by a system server and over a network, an electronic communication account associated with a first user of the plurality of users;
    obtaining, from the first user's electronic communication account, electronic identifier information for at least a second user of the plurality of users;
    identifying, in a database associated with the system server that stores central contact information for the first user, whether at least a portion of the second user's electronic identifier information is included in the first user's central contact information; and
    if at least the portion of the second user's electronic identifier information is not included in the first user's central contact information, generating, for the second user, a request to exchange contact information with the first user, wherein the request is one of:
        automatically transmitted, by the system server, to the second user without input from the first user; and
        transmitted by the system server only upon receiving input from the first user
    receiving, from the second user and at the system server, a response to the request to exchange contact information, wherein the response is indicative of one of declining and accepting the request to exchange contact information with the first user and the response is one of automatically generated without receiving input from the second user and generated only upon receiving input from the second user.

5. The method of claim 4, wherein the response from the second user is generated in response to only a one-click action being performed by the second user.

6. The method of claim 5, wherein the one-click action specifies one of a delete request to exchange contact information action, an exchange only home contact information action, an exchange only work contact information action and an exchange home and work contact information action and wherein, in the event of an exchange of contact information, the one-click action further specifies information pertaining to whether at least one of phone, email or address are to be exchanged.

7. The method of claim 4, wherein when the request is transmitted by the system server only upon receiving input from the first user, the input from the first user generated in response to only a one-click action being performed by the first user.

8. The method of claim 7, wherein the one-click action specifies one of a delete request to exchange action, an exchange only home contact information action, an exchange only work contact information action and an exchange home and work contact information action and wherein, in the event of an exchange of contact information, the one-click action further specifies information pertaining to whether at least one of phone, email or address are to be exchanged.

9. The method of claim 4, wherein the electronic identifier information is an email address.

10. The method of claim 4, further comprising:
   determining whether the second user is a registered user of the network-based contact management system; and
   if the second user is not a registered user, inviting the second user to register with the network-based contact management system.

11. The method of claim 4, wherein the first user's electronic communication account is an e-mail account, the e-mail account accessed on one of a periodic and one-time basis.

* * * * *